(12) United States Patent
Murg

(10) Patent No.: US 10,700,500 B2
(45) Date of Patent: *Jun. 30, 2020

(54) APPARATUS AND METHOD FOR CUTTING AND STRIPPING AN ELECTRICAL CABLE

(71) Applicant: Stride Tool, LLC, Glenwillow, OH (US)

(72) Inventor: Leonard R. Murg, Glenwillow, OH (US)

(73) Assignee: STRIDE TOOL, LLC., Glenwillow, OH (US)

( * ) Notice: Subject to any disclaimer, the term of this patent is extended or adjusted under 35 U.S.C. 154(b) by 63 days.

This patent is subject to a terminal disclaimer.

(21) Appl. No.: 16/044,777

(22) Filed: Jul. 25, 2018

(65) Prior Publication Data

US 2019/0058314 A1 Feb. 21, 2019

Related U.S. Application Data

(60) Provisional application No. 62/545,558, filed on Aug. 15, 2017.

(51) Int. Cl.
*H02G 1/12* (2006.01)
*H02G 1/00* (2006.01)

(52) U.S. Cl.
CPC ........... *H02G 1/1214* (2013.01); *H02G 1/005* (2013.01); *H02G 1/1295* (2013.01)

(58) Field of Classification Search
CPC .. H02G 1/1204; H02G 1/1207; H02G 1/1209; H02G 1/1212; H02G 1/1214; H02G 1/1217; H02G 1/1219; H02G 1/1221
See application file for complete search history.

(56) References Cited

U.S. PATENT DOCUMENTS

| | | | | |
|---|---|---|---|---|
| 1,354,365 A | * | 9/1920 | Aaron | H02G 1/1229 30/90.6 |
| 1,800,317 A | * | 4/1931 | Ries | H02G 1/1229 30/176 |
| 4,607,544 A | * | 8/1986 | Jewell, Jr. | H02G 1/1214 140/121 |
| 5,003,846 A | * | 4/1991 | Yagawa | G02B 6/245 30/90.6 |
| 5,323,502 A | * | 6/1994 | Miller | H02G 1/1214 30/90.6 |

(Continued)

*Primary Examiner* — Jason Daniel Prone
*Assistant Examiner* — Richard D Crosby, Jr.
(74) *Attorney, Agent, or Firm* — Tarolli, Sundheim, Covell & Tummino LLP

(57) ABSTRACT

An electrical stripping and cutting tool having first and second elongated members that are pivotable about a laterally extending pivot axis relative to each other. First and second face plates are attached to distal ends of the first and second elongated members. In a closed position of the electrical cable stripping and cutting tool, the first and second face plates collectively form a single flat face plate. First and second pairs of cutting members are respectively formed on first and second sides of the first and second face plates. Cutting surfaces of the first pair of cutting members are shaped and dimensioned to cut through an outer sheath of an electrical cable having a first sheath dimension. Cutting surfaces of the second pair of cutting members are shaped and dimensioned to cut through an outer sheath of an electrical cable having a second sheath dimension.

20 Claims, 11 Drawing Sheets

(56) References Cited

U.S. PATENT DOCUMENTS

| | | | | |
|---|---|---|---|---|
| 5,894,617 | A * | 4/1999 | Liou | B25B 7/02 |
| | | | | 7/107 |
| 6,502,310 | B1 * | 1/2003 | Shaw | H02G 1/1295 |
| | | | | 30/90.4 |
| 6,618,885 | B1 * | 9/2003 | Blaustein | H02G 1/1214 |
| | | | | 7/107 |
| 6,619,158 | B2 * | 9/2003 | Bates | H02G 1/1214 |
| | | | | 30/90.1 |
| 7,258,603 | B1 * | 8/2007 | Martin | A22C 29/024 |
| | | | | 452/6 |
| 7,409,736 | B2 * | 8/2008 | Konen | H02G 1/1214 |
| | | | | 7/107 |
| 8,074,536 | B1 * | 12/2011 | Allen | B26B 13/06 |
| | | | | 30/90.6 |
| 9,472,927 | B2 * | 10/2016 | Satern | H02G 1/1214 |
| 9,979,168 | B2 * | 5/2018 | Dulac | H02G 1/12 |
| 2002/0004984 | A1 * | 1/2002 | Murg | H02G 1/1214 |
| | | | | 29/867 |
| 2015/0188272 | A1 * | 7/2015 | Esterkin | H01R 43/0421 |
| | | | | 7/107 |

* cited by examiner

APPARATUS AND METHOD FOR CUTTING AND STRIPPING AN ELECTRICAL CABLE

RELATED APPLICATION

This application claims priority from U.S. Provisional Application No. 62/545,558, filed 15 Aug. 2017, the subject matter of which is incorporated herein by reference in its entirety.

TECHNICAL FIELD

This disclosure relates to an apparatus and method for use of an electrical cable stripping and cutting tool and, more particularly, to an apparatus and method for cutting and stripping an electrical cable.

BACKGROUND

An electrician or another individual may often work with electrical cables. For example, the electrical cable may have a non-metallic outer sheath that surrounds multiple individual conductors, which are insulated from each other by insulation covering the individual conductors. The electrical cable may include two current-carrying conductors with individual insulation and an uninsulated or bare ground wire. The electrician or another individual may want to cut the outer sheath and strip a length of the outer sheath away from the conductors without cutting, nicking, or otherwise damaging the conductors or the individual conductor insulation for the conductors. In addition, after removing the outer sheath, the electrician or other individual may want to cut the individual conductor insulation on one or more of the conductors and strip a length of insulation from a conductor without cutting, nicking, or otherwise damaging the conductors.

SUMMARY

In an aspect, an electrical cable stripping and cutting tool is provided. The electrical cable includes an outer sheath radially surrounding at least one electrical conductor which is radially surrounded by individual conductor insulation. The electrical cable stripping and cutting tool has a first elongated member having a proximal end and a longitudinally opposite distal end. A second elongated member has a proximal end and a longitudinally opposite distal end. The second elongated member is joined to the first elongated member such that the first and second elongated members are pivotable about a laterally extending pivot axis relative to each other. A first face plate is attached to the distal end of the first elongated member. The first face plate is oriented substantially perpendicular to a longitudinal axis of the first elongated member. The first face plate has a first side and a laterally opposite second side. A second face plate is attached to the distal end of the second elongated member. The second face plate is oriented substantially perpendicular to a longitudinal axis of the second elongated member. The second face plate has a first side and a laterally opposite second side. In a closed position of the electrical cable stripping and cutting tool, the first side of the first face plate abuts the first side of the second face plate, the second side of the first face plate abuts the second side of the second face plate, and the first and second face plates collectively form a single flat face plate. A first pair of cutting members is formed on the first side of the first and second face plates. Each of the first pair of cutting members has a cutting surface presented toward the other cutting surface of the first pair of cutting members. A second pair of cutting members is formed on the second side of the first and second face plates. Each of the second pair of cutting members has a cutting surface presented toward the other cutting surface of the second pair of cutting members. The cutting surfaces of the first pair of cutting members are shaped and dimensioned to cut through an outer sheath of an electrical cable having a first sheath dimension without cutting the individual conductor insulation covering the at least one electrical conductor and without cutting the at least one electrical conductor when at least a portion of the electrical cable having the outer sheath with the first sheath dimension extends longitudinally between the first pair of cutting members. The cutting surfaces of the second pair of cutting members are shaped and dimensioned to cut through an outer sheath of an electrical cable having a second sheath dimension without cutting the individual conductor insulation covering the at least one electrical conductor and without cutting the at least one electrical conductor when at least a portion of the electrical cable having the outer sheath with the second sheath dimension extends longitudinally between the first pair of cutting members. The second sheath dimension is smaller than the first sheath dimension.

In an aspect, a method for cutting and stripping an electrical cable is provided. An electrical cable including an outer sheath surrounding at least one electrical conductor covered with individual conductor insulation is provided. An electrical cable stripping and cutting tool is provided. The electrical cable stripping and cutting tool has a first elongated member having a proximal end and a longitudinally opposite distal end. A second elongated member has a proximal end and a longitudinally opposite distal end. The second elongated member is joined to the first elongated member such that the first and second elongated members are pivotable about a laterally extending pivot axis relative to each other. A first face plate is attached to the distal end of the first elongated member. The first face plate is oriented substantially perpendicular to a longitudinal axis of the first elongated member. The first face plate has a first side and a laterally opposite second side. A second face plate is attached to the distal end of the second elongated member. The second face plate is oriented substantially perpendicular to a longitudinal axis of the second elongated member. The second face plate has a first side and a laterally opposite second side. In a closed position of the electrical cable stripping and cutting tool, the first side of the first face plate abuts the first side of the second face plate, the second side of the first face plate abuts the second side of the second face plate, and the first and second face plates collectively form a single flat face plate. A first pair of cutting members is formed on the first side of the first and second face plates. Each of the first pair of cutting members has a cutting surface presented toward the other cutting surface of the first pair of cutting members. A second pair of cutting members is formed on the second side of the first and second face plates. Each of the second pair of cutting members has a cutting surface presented toward the other cutting surface of the second pair of cutting members. The cutting surfaces of the first pair of cutting members are shaped and dimensioned to cut through an outer sheath of an electrical cable having a first sheath dimension without cutting the individual conductor insulation covering the at least one electrical conductor and without cutting the at least one electrical conductor when at least a portion of the electrical cable having the outer sheath with the first sheath dimension extends longitudinally between the first pair of cutting members. The cutting surfaces of the second pair of cutting members are shaped and dimensioned to cut through an outer sheath of an electrical cable having a second sheath dimension without cutting the individual conductor insulation covering the at least one electrical conductor and without cutting the at least one electrical conductor when at least a portion of the electrical cable having the outer sheath with the second sheath dimension extends longitudinally between the first pair of cutting members. The second sheath dimension is smaller than the first sheath dimension. The electrical cable stripping and cutting tool is moved to an open position. It is determined whether the electrical cable has the first sheath dimension or the second sheath dimension. When it is determined that the electrical cable has the first sheath dimension, a cut portion of the outer sheath is removed from the electrical cable to expose a portion of the individual conductor insulation covering the at least one electric conductor by placing at least a portion of the electrical cable having the first sheath dimension longitudinally between the first pair of cutting members. With the electrical cable having the first sheath dimension longitudinally between the first pair of cutting members, a portion of the outer sheath is cut at least partially through by moving the electrical cable stripping and cutting tool toward the closed position. Motion of the electrical cable stripping and cutting tool toward the closed position causes the cutting surfaces of the first pair of cutting members to move together over the electrical cable to cut at least partially through a portion of the outer sheath of the electrical cable. The cut portion of the outer sheath is removed. When it is determined that the electrical cable has the second sheath dimension, a cut portion of the outer sheath is removed from the electrical cable to expose a portion of the individual conductor insulation covering the at least one electric conductor by placing at least a portion of the electrical cable having the second sheath dimension longitudinally between the second pair of cutting members. With the electrical cable having the first sheath dimension longitudinally between the second pair of cutting members, a portion of the outer sheath is cut at least partially through by moving the electrical cable stripping and cutting tool toward the closed position. Motion of the electrical cable stripping and cutting tool toward the closed position causes the cutting surfaces of the second pair of cutting members to move together over the electrical cable to cut at least partially through a portion of the outer sheath of the electrical cable. The cut portion of the outer sheath is removed.

BRIEF DESCRIPTION OF THE DRAWINGS

For a better understanding, reference may be made to the accompanying drawings, in which.

DESCRIPTION OF EMBODIMENTS

Figure 1:
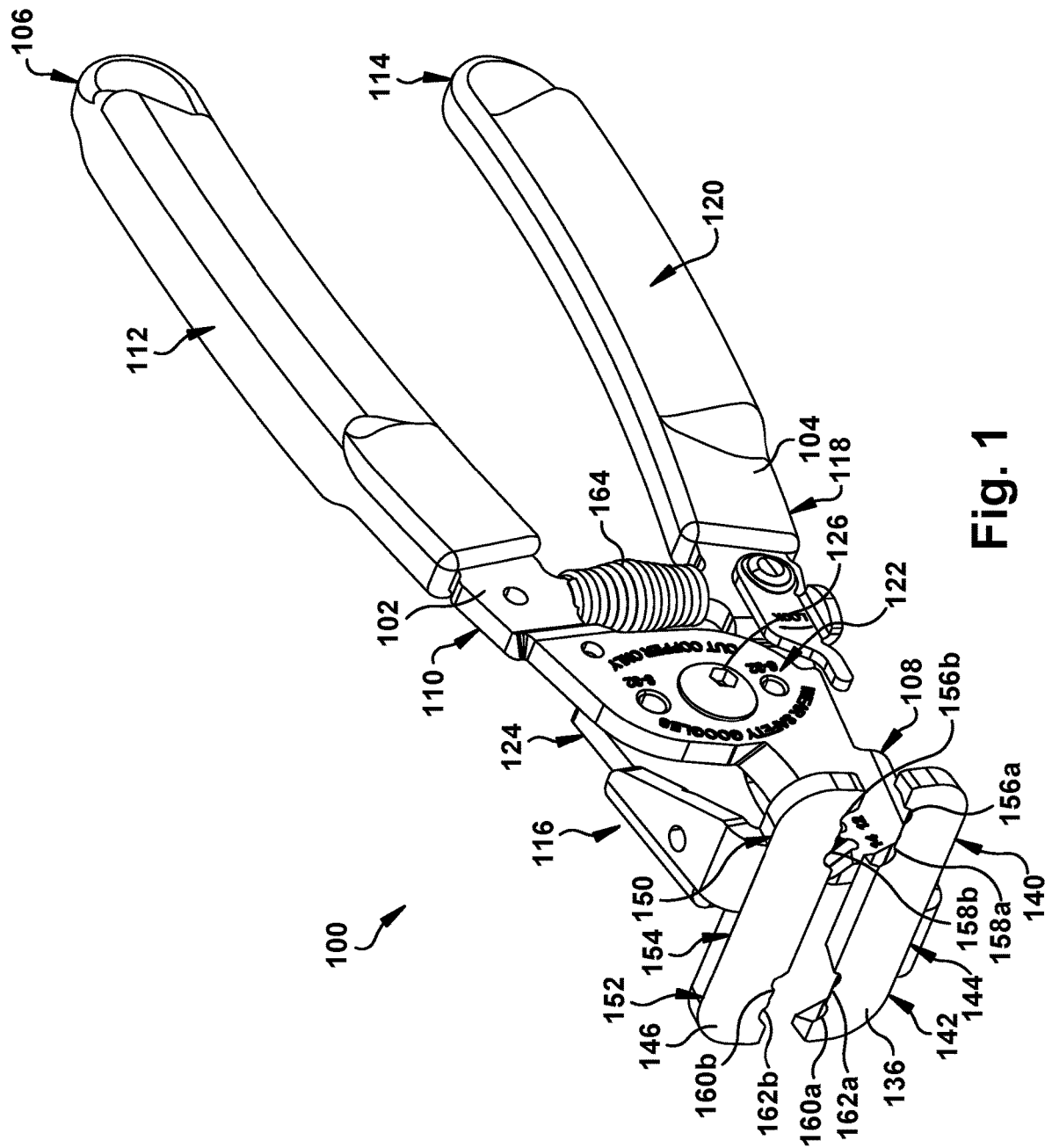
FIG. 1 is a perspective side view of an electrical cable stripping and cutting tool according to one aspect of the present invention, in an open configuration.

Unless defined otherwise, all technical and scientific terms used herein have the same meaning as is commonly understood by one of skill in the art to which the present disclosure pertains.

As used herein, the term "user" can be used interchangeably to refer to an individual who prepares for, assists with, and/or performs the operation of a tool.

As used herein, the singular forms "a," "an" and "the" can include the plural forms as well, unless the context clearly indicates otherwise. It will be further understood that the terms "comprises" and/or "comprising," as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

As used herein, phrases such as "between X and Y" can be interpreted to include X and Y.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that when an element is referred to as being "on," "attached" to, "connected" to, etc., another element, it can be directly on, attached to or connected to the other element or intervening elements may also be present. In contrast, when an element is referred to as being, for example, "directly attached" to another element, there are no intervening elements present. It will also be appreciated by those of skill in the art that references to a structure or feature that is disposed "adjacent" another feature may not have portions that overlap or underlie the adjacent feature.

Spatially relative terms, such as "over" and the like, may be used herein for ease of description to describe one element or feature's relationship to another element(s) or feature(s) as illustrated in the Figures. It will be understood that the spatially relative terms can encompass different orientations of a device in use or operation, in addition to the orientation depicted in the Figures. For example, if a device in the Figures is inverted, elements described as "under" or "beneath" other elements or features would then be oriented "over" the other elements or features.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or Figures unless specifically indicated otherwise.

The invention comprises, consists of, or consists essentially of the following features, in any combination.

FIG. 1 depicts an electrical cable stripping and cutting tool 100 for stripping an electrical cable having an outer sheath radially surrounding at least one electrical conductor which is radially surrounded by individual conductor insulation. The outer sheath may also surround a bare ground wire or conductor without individual conductor insulation, which may be disposed between the insulation-surrounded conductors. The electrical cable stripping and cutting tool 100 has first and second elongated members 102, 104. The first elongated member 102 has a proximal end 106, a longitudinally opposite distal end 108, and a length 110 extending from the proximal end 106 of the first elongated member 102 to the distal end 108 of the first elongated member 102. The term "longitudinal" is used herein to indicate a substantially horizontal direction, in the orientation of FIG. 1. The first elongated member 102 may have a handle portion 112 that extends distally from the proximal end 106 of the first elongated member 102 for at least a portion of the length 110 of the first elongated member 102.

The second elongated member 104 has a proximal end 114, a longitudinally opposite distal end 116, and a length 118 that extends from the proximal end 114 of the second elongated member 104 to the distal end 116 of the second elongated member 104. The second elongated member 104 may have a handle portion 120 that extends distally from the proximal end 114 of the second elongated member 104 for at least a portion of the length 118 of the second elongated member 104. Each handle portion 112, 120 may be at least partially ergonomically shaped, rubber-coated, cushioned, and/or have any suitable characteristics for assisting a user with comfortably gripping the electrical cable stripping and cutting tool 100 for use as desired.

A substantially ovoid, disc-like offset portion 122 may be formed in the length of the first elongated member 102. A similar substantially ovoid, disc-like offset portion 124 may also be formed at approximately the same position along the length of the second elongated member 104. The first and second elongated members 102, 104 may be placed side by side at the offset portions 122, 124.

Figure 2:
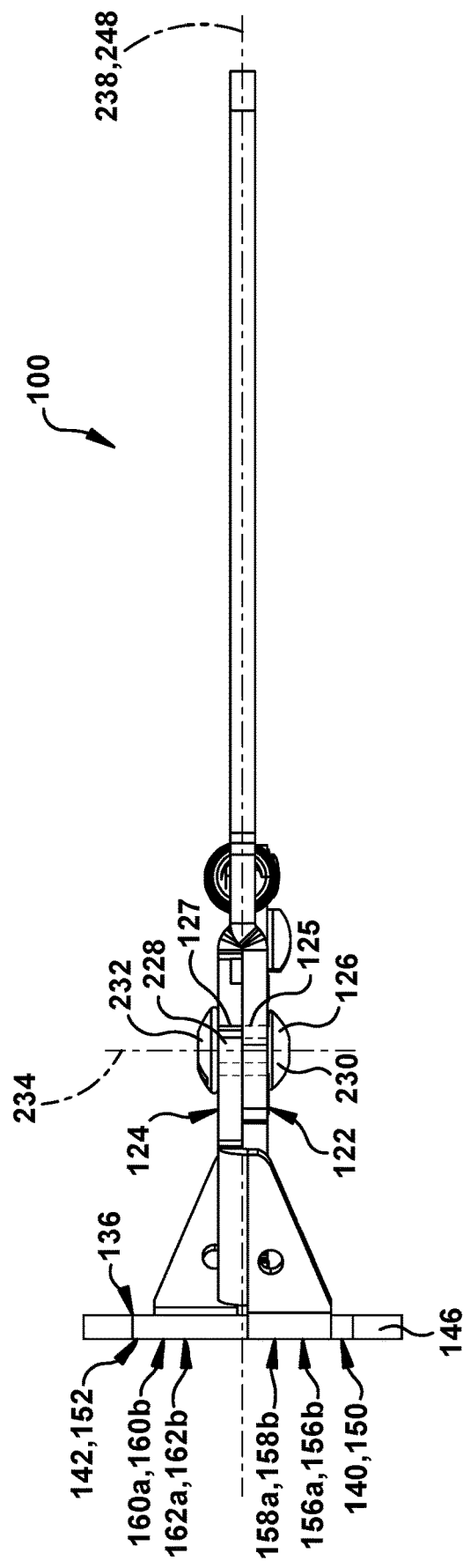
FIG. 2 is a top view of the aspect of FIG. 1.

Each offset portion 122, 124 has an opening 125, 127 that passes laterally through the corresponding first or second elongated member 102, 104. When the first and second elongated members 102, 104 are placed side by side at the offset portions 122, 124, the openings 125, 127 are laterally aligned. The term "lateral" is used herein to indicate a direction substantially perpendicular to the "longitudinal" direction, and is shown as the vertical direction in the orientation of FIG. 2. A fastener 126 is received in the aligned openings 125, 127. As shown in FIG. 2, the fastener 126 has a shaft 228 received in the aligned openings 125, 127. At opposite ends of the shaft 228, the fastener 126 has enlargements 230, 232 that are too large to pass through the aligned openings 125, 127 in the offset portions 122, 124. The enlargements 230, 232 may be permanently fixed to the shaft 228, as by being formed in one piece with the shaft 228, or may be removable from the shaft 228, as by being nuts engaged with a threaded portion of the shaft 228. The fastener 126 may be a rivet, if it is desired to join the first elongated member 102 to the second elongated member 104 in a permanent or nonremovable manner, or may a bolt with a removably attached nut, if it is desired to join the first elongated member 102 to the second elongated member 104 in a manner that can be reversed as may be desired, for example, for replacement of one of the first and second elongated members 102, 104.

The shaft 228 of the fastener 126 provides a laterally oriented axle or shaft for pivotal movement of the first and second elongated members 102, 104 relative to one another. Thus, the second elongated member 104 is joined to the first elongated member 102 such that the first and second elongated members 102, 104 are pivotable about a laterally extending pivot axis 234, corresponding to the shaft 228 of the fastener 126, relative to each other.

As shown in FIGS. 1-2, a first face plate 136 is attached to the distal end 108 of the first elongated member 102. The first face plate 136 is oriented substantially perpendicular to a longitudinal axis 238 of the first elongated member 102 (FIG. 2). The first face plate 136 has a first side 140 and a laterally opposite second side 142 and a length 144 extending laterally from the first side 140 of the first face plate 136 to the second side 142 of the first face plate 136.

A second face plate 146 is attached to the distal end 116 of the second elongated member 104. The second face plate 146 is oriented substantially perpendicular to a longitudinal axis 248 of the second elongated member 104 (FIG. 2). The second face plate 146 has a first side 150 and a laterally opposite second side 152 and a length 154 extending laterally from the first side 150 of the second face plate 146 to the second side 152 of the second face plate 146.

Figure 3:
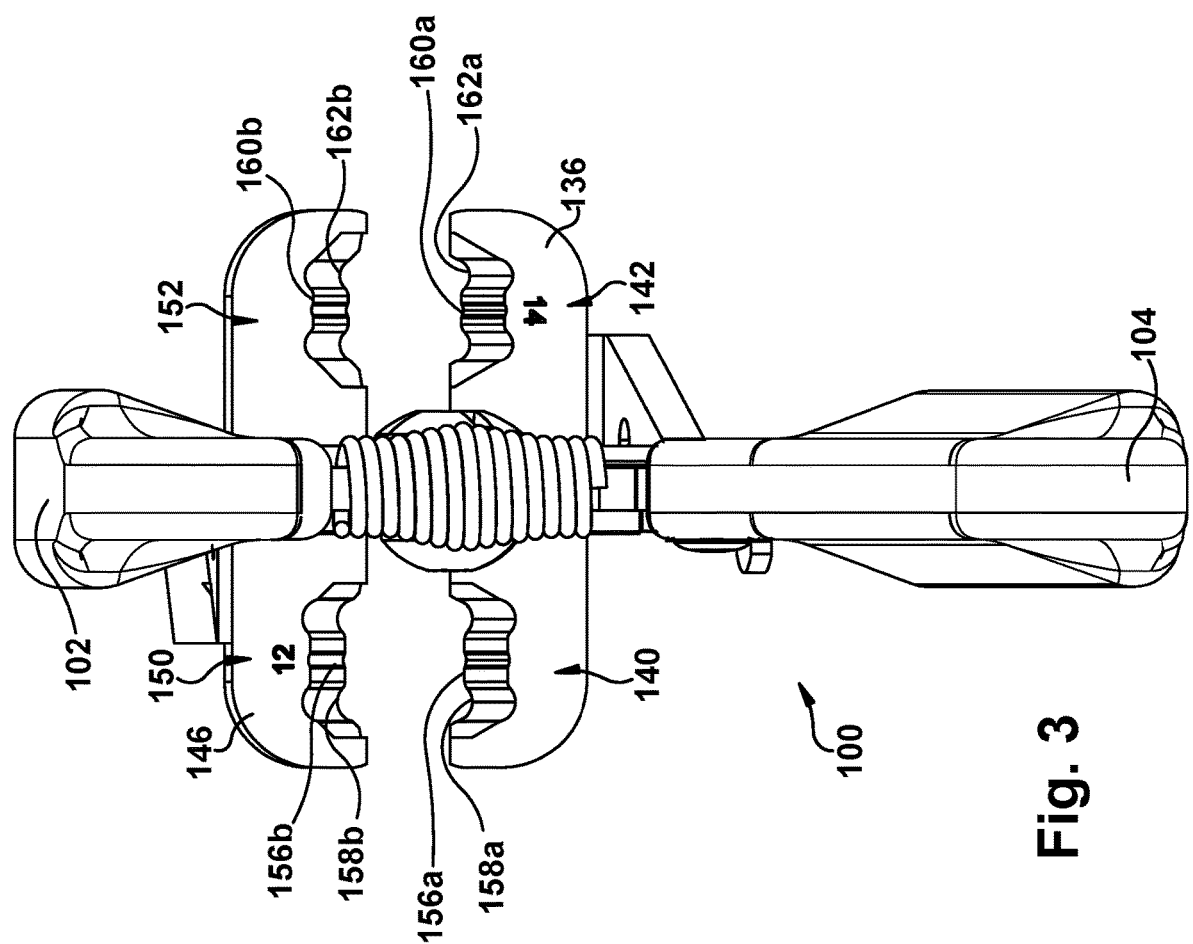
FIG. 3 is a rear view of the aspect of FIG. 1, in the open configuration.

Referring to FIGS. 1-3, a first pair of cutting members 156 (shown here as the first pair of cutting members 156a, 156b) is formed on the first side 140, 150 of the first and second face plates 136, 146. One of the first pair of cutting members 156a, 156b is formed on one of the first and second face plates 136, 146. The other of the first pair of cutting members 156a, 156b is formed on the other of the first and second face plates 136, 146. Each of the first pair of cutting members 156a, 156b has a cutting surface 158 (shown here as the cutting surfaces 158a, 158b) oriented lateral to the longitudinal axis 238 of the first elongated member 102 and the longitudinal axis 248 of the second elongated member 104 (FIG. 3). Each cutting surface 158a, 158b of the first pair of cutting members 156a, 156b is presented toward the other cutting surface 158a, 158b of the first pair of cutting members 156a, 156b. The cutting surfaces 158a, 158b of the first pair of cutting members 156a, 156b are shaped and dimensioned to cut through an outer sheath of an electrical cable having a first sheath dimension without cutting the individual conductor insulation covering the at least one electrical conductor and without cutting the at least one electrical conductor when at least a portion of the electrical cable extends longitudinally between the first pair of cutting members 156a, 156b.

"Cut through", "cutting", and similar language, as used herein, are intended to indicate that the "cut" item is substantially severed. For example, an outer sheath could be considered to be "cut through" at a circumference thereof by the electrical cable stripping and cutting tool 100, even if some minimal portion of the outer sheath is still attached (e.g., at opposite diameters of the outer sheath), as long as a minor effort can readily be exerted to snap the still-attached portion in a frangible manner. As a result, these remaining attachments can be used to ensure that a "cut" off portion does not slip off unwantedly.

It is also intended that the term "without cutting" is interpreted throughout as meaning "without substantially cutting" the subject structure. For example, the outer sheath of the electrical cable should be considered to have been cut through "without cutting" the individual conductor insulation, while still admitting of some slight amount of nicking, slicing, denting, creasing, marking, or other permanent or temporary damage or alteration to the individual conductor insulation, as long as the individual conductor insulation is not cut through (as previously discussed). One of ordinary skill in the art will recognize that manufacturing tolerances, the tool usage style of an individual user, variances in electrical cable sizes, and other factors could contribute to a situation wherein the "cut" or "not cut" status of a component of the electrical cable can vary and is not a binary or absolute determination.

As shown in FIGS. 1-3, a second pair of cutting members 160 (shown here as the second pair of cutting members 160a, 160b) is formed on the second side 142, 152 of the first and second face plates 136, 146. One of the second pair of cutting members 160a, 160b is formed on one of the first and second face plates 136, 146. The other of the second pair of cutting members 160a, 160b is formed on the other of the first and second face plates 136, 146. Each of the second pair of cutting members 160a, 160b has a cutting surface 162 (shown here as the cutting surfaces 162a, 162b) oriented lateral to the longitudinal axis 238 of the first elongated member 102 and the longitudinal axis 248 of the second elongated member 104 (FIG. 3). Each cutting surface 162a, 162b of the second pair of cutting members 160a, 160b is presented toward the other cutting surface 162a, 162b of the second pair of cutting members 160a, 160b. The cutting surfaces 162a, 162b of the second pair of cutting members 160a, 160b are shaped and dimensioned to cut through an outer sheath of an electrical cable having a second sheath dimension, which is smaller than the first sheath dimension, without cutting the individual conductor insulation covering the at least one electrical conductor and without cutting the at least one electrical conductor when at least a portion of the electrical cable extends longitudinally between the second pair of cutting members 160a, 160b.

Because the first pair of cutting members 156a, 156b is designed to cut through an outer sheath of an electrical cable having a first sheath dimension, and the second pair of cutting members 160a, 160b is designed to cut through an outer sheath of an electrical cable having a second sheath dimension, the electrical cable stripping and cutting tool 100 provides a user with the ability to cut through the outer sheath of electrical cables having the first sheath dimension and through the outer sheath of electrical cables having the second sheath dimension without having to use two separate tools. For example, the electrical cable stripping and cutting tool 100 may be used as a hand tool to strip and cut a non-metallic electrical cable, such as cable sold under the trademark Romex® by Southwire Company, LLC of Carrollton, Ga., USA. Non-metallic electrical cables include electrical conductors having standardized sizes, such as, but not limited to, 12 Gauge and 14 Gauge, assigned by systems such as the American Wire Gauge. Non-metallic electrical cables may include bundles of individual electrical conductors. A 12/2 Gauge electrical cable has an outer sheath covering a bundle of three solid 12 Gauge electrical conductors having a bare ground electrical conductor in the middle of two insulated electrical conductors. A 14/2 Gauge electrical cable has an outer sheath covering a bundle of three solid 14 Gauge electrical conductors having a bare ground electrical conductor in the middle of two insulated electrical conductors. The outer sheath of a 12/2 Gauge electrical cable is typically larger than the outer sheath of a 14/2 Gauge electrical cable because 12 Gauge electrical conductors have a larger diameter than 14 Gauge electrical conductors.

The first pair of cutting members 156a, 156b may be at least partially shaped and dimensioned to cut through the outer sheath of a 12/2 Gauge electrical cable, and the second pair of cutting members 160a, 160b may be at least partially shaped and dimensioned to cut through the outer sheath of a 14/2 Gauge electrical cable. In such case, the electrical cable stripping and cutting tool 100 is applicable to cut through the outer sheath of both a 12/2 Gauge electrical cable, using the first pair of cutting members 156a, 156b, and a 14/2 Gauge electrical cable, using the second pair of cutting members 160a, 160b. Although, 12/2 Gauge and 14/2 Gauge electrical cables have been described in the above as being cut by the first and second pairs of cutting members 156a, 156b, 160a, 160b, the first and second pairs of cutting members 156a, 156b, 160a, 160b may be at least partially shaped and dimensioned to cut through the outer sheath of any desired gauged electrical cable.

Referring back to FIG. 1, the electrical cable stripping and cutting tool 100 is shown in an open position. In the open position, the handle portions 112, 120 of the first and second elongated members 102, 104 are spaced apart further than they are in a closed position, as will be discussed later, the first side 140 of the first face plate 136 is spaced apart from the first side 150 of the second face plate 146, and the second side 142 of the first face plate 136 is spaced apart from the second side 152 of the second face plate 146. The electrical cable stripping and cutting tool 100 may have a biasing member 164, such as a spring, that extends between the first and second elongated members 102, 104. The biasing member 164, when present, biases the electrical cable stripping and cutting tool 100 toward the open position.

Figure 4:
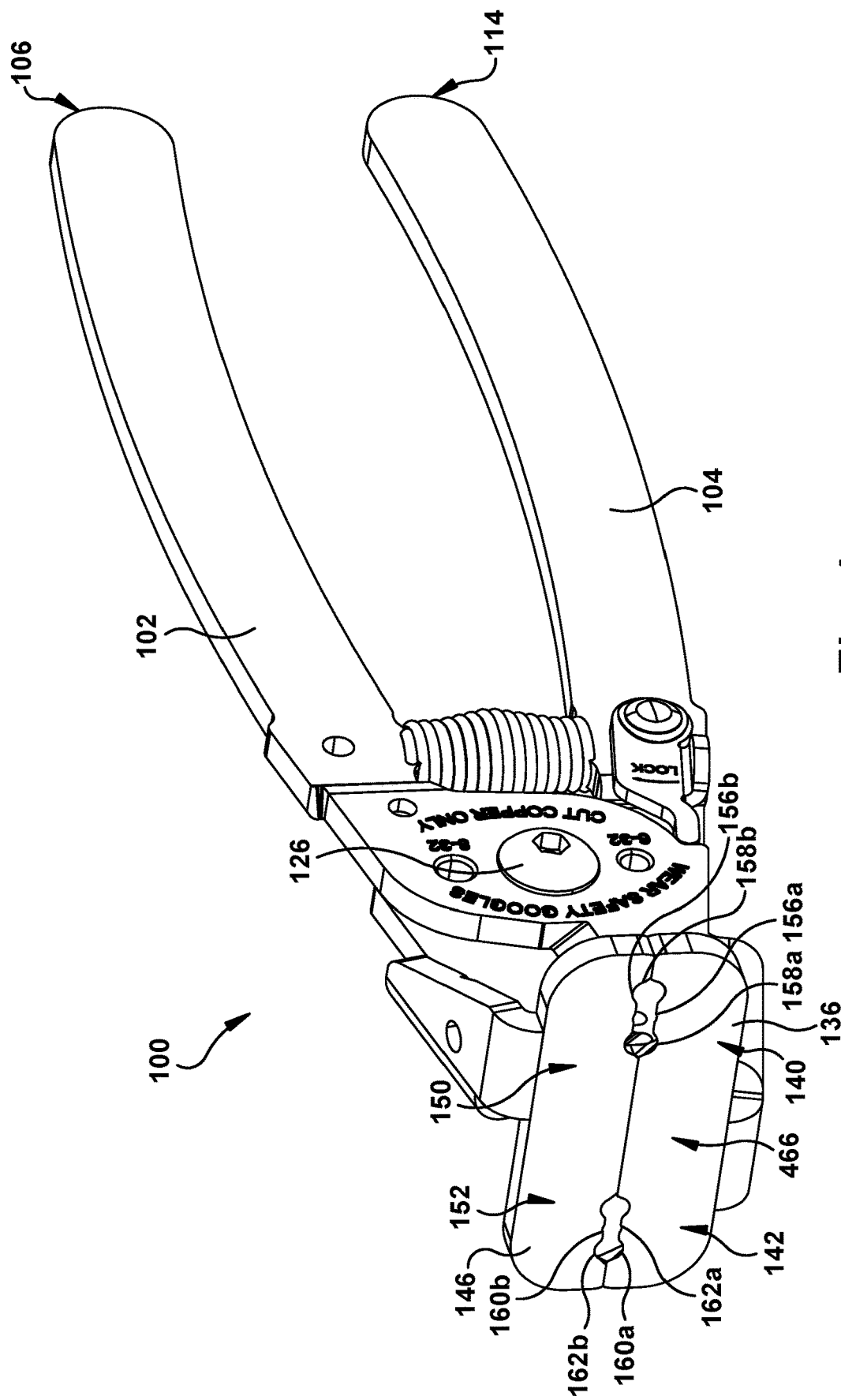
FIG. 4 is a perspective side view of the aspect of FIG. 1, in a closed configuration.

FIG. 4 depicts the electrical cable stripping and cutting tool 100 in a closed position. In the closed position of the electrical cable stripping and cutting tool 100, the first side 140 of the first face plate 136 abuts the first side 150 of the second face plate 146, the second side 142 of the first face plate 136 abuts the second side 152 of the second face plate 146, and the first and second face plates 136, 146 collectively form a single flat face plate 466. As shown in FIGS. 1 and 4, the cutting surfaces 158a, 158b of the first pair of cutting members 156a, 156b move toward one another upon pivotal movement of the first and second elongated members 102, 104 about the pivot axis 234, corresponding to the fastener 126, relative to each other such that the proximal end 106 of the first elongated member 102 and the proximal end 114 of the second elongated member 104 move toward one another as the electrical cable stripping and cutting tool 100 moves toward the closed position. The cutting surfaces 162a, 162b of the second pair of cutting members 160a, 160b move toward one another upon pivotal movement of the first and second elongated members 102, 104 about the pivot axis 234, corresponding to the fastener 126, relative to each other such that the proximal end 106 of the first elongated member 102 and the proximal end 114 of the second elongated member 104 move toward one another as the electrical cable stripping and cutting tool 100 moves toward the closed position.

Figure 5:
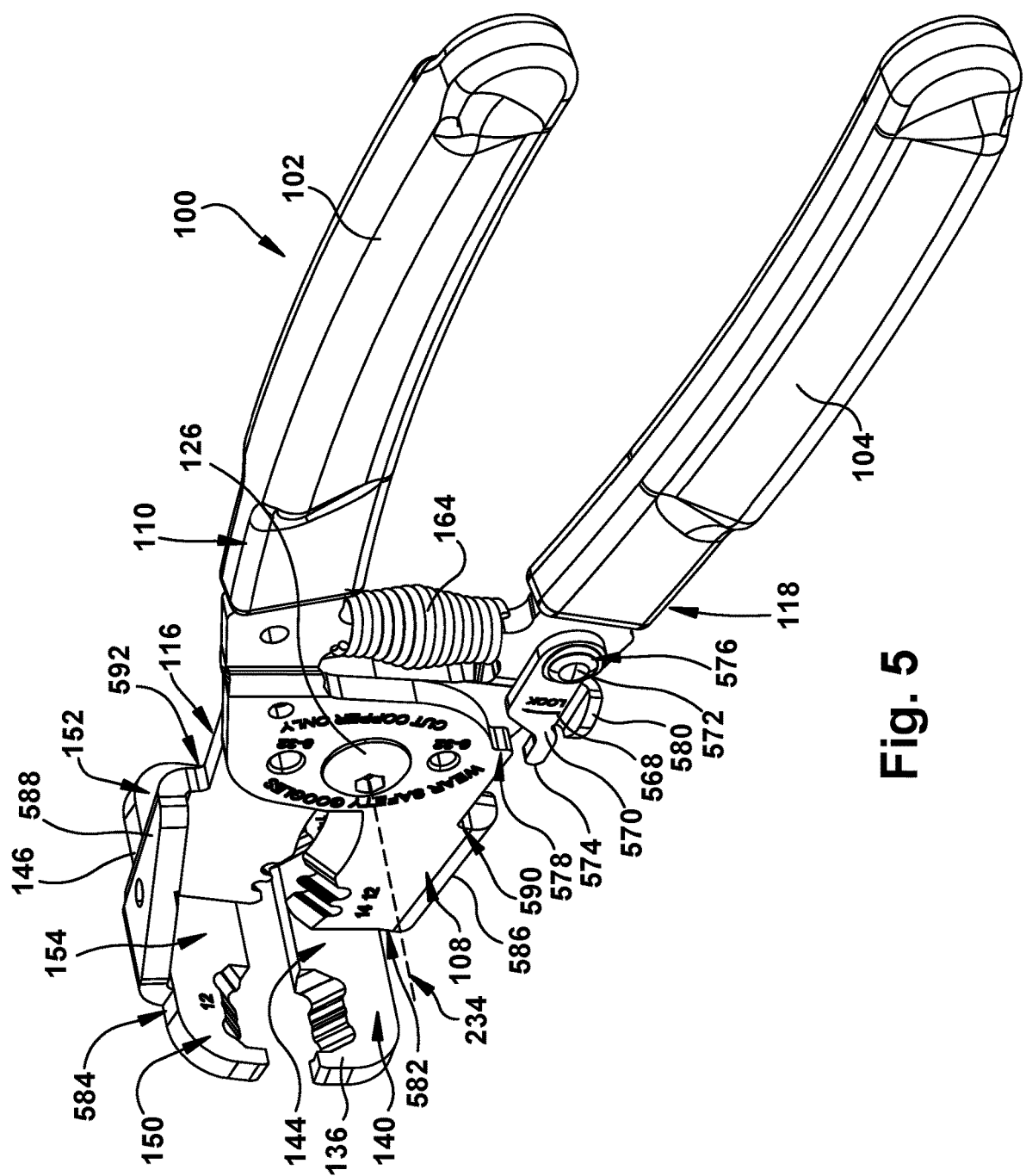
FIG. 5 is a rear perspective view of the aspect of FIG. 1, in the open configuration.

As shown in FIG. 5, the electrical cable stripping and cutting tool 100 may include a locking mechanism 568. The locking mechanism 568 may be positioned on at least one of the first and second elongated members 102, 104. After the first and second elongated members 102, 104 are pivoted about the pivot axis 234 relative to each other such that the electrical cable stripping and cutting tool 100 is moved from the open position to the closed position, the locking mechanism 568 may be actuated to maintain the electrical cable stripping and cutting tool 100 in the closed position. The locking mechanism 568 may include a rotatable lever 570 and a pivot pin 572. The lever 570 is an elongated flat member having an locking end 574 at one end of the lever 570 and a circular opening 576 adjacent to the other end of the lever 570. The circular opening 576 is dimensioned and configured to receive the pivot pin 572, which may be mounted in a permanent and non-removable manner on the second elongated member 104 so as to project substantially perpendicular to the length and longitudinal axis 248 of the second elongated member 104. Alternatively, the pivot pin 572 may be removably mounted to the second elongated member 104, permanently mounted to the first elongated member 102, or removably mounted to the first elongated member 102. When the pivot pin 572 is received in the circular opening 576, the lever 570 pivotally or rotatably mounted on the pivot pin 572.

The first elongated member 102 may have a locking surface 578 that is capable of receiving the locking end 574 of the lever 570. Alternatively, the locking surface 578 may be located on the second elongated member 104. In use of the rotatable lever locking mechanism 568, 570, after the first and second elongated members 102, 104 are pivoted about the pivot axis 234 relative to each other such that the electrical cable stripping and cutting tool 100 is moved from the open position to the closed position, the lever 570 may be rotated to abut the locking end 574 of the lever 570 against the locking surface 578 of the first elongated member 102. The engagement of the locking end 574 of the lever 570 with the locking surface 578 prevents the electrical cable stripping and cutting tool 100 from moving to the open position. However, when the lever 570 is in engagement with the locking surface 578, the first and second elongated members 102, 104 may be spaced apart a small, predetermined distance. To assist in pivoting the lever 570 so as to move the locking end 574 of the lever 570 into and out of engagement with the locking surface 578, a thumb plate 580 may be attached to or formed in one piece with the lever 570 in a manner so as to project substantially perpendicular to the length 110, 118 and longitudinal axis 238, 248 of the first and second elongated members 102, 104 in the same direction as the pivot axis 234.

The first and second face plates 136, 146 may each be indirectly attached to the distal ends 108, 116 of the first and second elongated members 102, 104. Although only clearly seen as the second elongated member 104 in FIG. 5, the first and second face plates 136, 146 each may be attached to a first connection end 582, 584 of first and second connection elements 586, 588, respectively. A second connection end 590, 592 of the first and second connection elements 586, 588 are attached to the distal end 108, 116 of the first and second elongated members 102, 104, respectively. The first face plate 136, the first elongated member 102, and the first connection element 586, when provided, may be integrally manufactured as a single piece. As used herein, the phrase "integrally manufactured as a single piece" indicates a situation wherein the structures described as such are manufactured and used as a single piece, not assembled subcomponents. The second face plate 146, the second elongated member 104, and the second connection element 588, when provided, may be integrally manufactured as a single piece. Alternatively, a portion of the lengths 144, 154 of the first and second face plates 136, 146 between the first and second sides 140, 142, 150, 152 of the first and second face plates 136, 146 may be directly attached (i.e., without intervening first and second connection elements 586, 588) to the distal ends 108, 116 of the first and second elongated members 102, 104.

Figure 6:
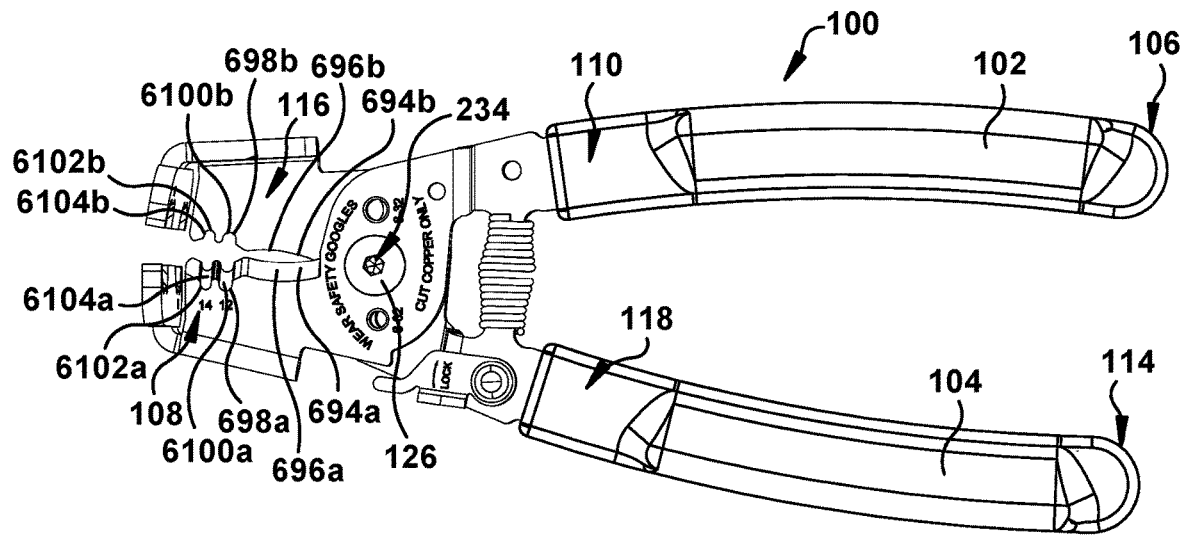
FIG. 6 is a side view of the aspect of FIG. 1, in the open configuration.
Figure 7:
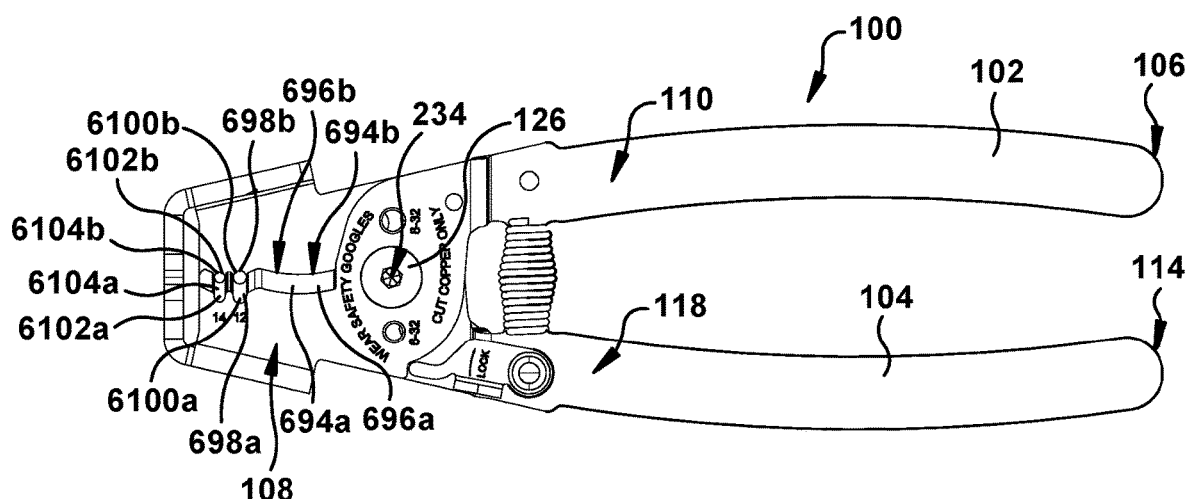
FIG. 7 is a side view of the aspect of FIG. 1, in the closed configuration.

As shown in FIGS. 6-7, a third pair of cutting members 694 (shown here as third pair of cutting members 694a, 694b), a fourth pair of cutting members 698 (shown here as fourth pair of cutting members 698a, 698b), and a fifth pair of cutting members 6102 (shown here as fifth pair of cutting members 6102a, 6102b) may be formed on the first and second elongated members 102, 104. One of the third pair of cutting members 694a, 694b is formed on one of the first and second elongated members 102, 104. The other of the third pair of cutting members 694a, 694b is formed on the other of the first and second elongated members 102, 104. Each of the third pair of cutting members 694a, 694b has a cutting surface 696 (shown here as cutting surfaces 696a, 696b) oriented along the length 110 of the first elongated member 102 and the length 118 of the second elongated member 104. Each cutting surface 696a, 696b of the third pair of cutting members 694a, 694b may be at least partially arcuate. Each cutting surface 696a, 696b of the third pair of cutting members 694a, 694b is presented toward the other cutting surface 696a, 696b of the third pair of cutting members 694a, 694b.

As shown in FIGS. 6-7, the cutting surfaces 696a, 696b of the third pair of cutting members 694a, 694b move toward one another upon pivotal movement of the first and second elongated members 102, 104 about the pivot axis 234 relative to each other such that the proximal end 106 of the first elongated member 102 and the proximal end 114 of the second elongated member 104 move toward one another as the electrical cable stripping and cutting tool 100 is moved toward the closed position. The third pair of cutting members 694a, 694b is formed and/or positioned such that the cutting surfaces 696a, 696b of the third pair of cutting members 694 will pass by one another in close proximity to one another as the electrical cable stripping and cutting tool 100 is moved toward the closed position. The cutting surfaces 696a, 696b of the third pair of cutting members 694a, 694b may be at least partially shaped and dimensioned for collectively shear-cutting the electrical cable when at least a portion of the electrical cable extends laterally between the third pair of cutting members 694a, 694b. The cutting surfaces 696a, 696b of the third pair of cutting members 694a, 694b may also be used to cut the electrical conductors and the ground wire of the electrical cable to an appropriate length for connection to an electrical outlet or other electrical device.

One of the fourth pair of cutting members 698a, 698b is formed on one of the first and second elongated members 102, 104. The other of the fourth pair of cutting members 698a, 698b is formed on the other of the first and second elongated members 102, 104. Each of the fourth pair of cutting members 698a, 698b has a cutting surface 6100 (shown here as cutting surfaces 6100a, 6100b) oriented along the length 110 of the first elongated member 102 and the length 118 of the second elongated member 104. Each cutting surface 6100a, 6100b of the fourth pair of cutting members 698a, 698b is presented toward the other cutting surface 6100a, 6100b of the fourth pair of cutting members 698a, 698b.

As shown in FIGS. 6-7, the cutting surfaces 6100a, 6100b of the fourth pair of cutting members 698a, 698b move toward one another upon pivotal movement of the first and second elongated members 102, 104 about the pivot axis 234 relative to each other such that the proximal end 106 of the first elongated member 102 and the proximal end 114 of the second elongated member 104 move toward one another as the electrical cable stripping and cutting tool 100 is moved toward the closed position. The fourth pair of cutting members 698a, 698b is formed and/or positioned such that the cutting surfaces 6100a, 6100b of the fourth pair of cutting members 698a, 698b will pass by one another in close proximity to one another as the electrical cable stripping and cutting tool 100 is moved toward the closed position. The cutting surfaces 6100a, 6100b of the fourth pair of cutting members 698a, 698b are shaped and dimensioned to cut through an individual conductor insulation having a first insulation dimension and covering one electrical conductor without cutting the one electrical conductor when at least a portion of the one electrical conductor covered by the individual conductor insulation extends laterally between the fourth pair of cutting members 698a, 698b.

One of the fifth pair of cutting members 6102a, 6102b is formed on one of the first and second elongated members 102, 104. The other of the fifth pair of cutting members 6102a, 6102b is formed on the other of the first and second elongated members 102, 104. Each of the fifth pair of cutting members 6102a, 6102b has a cutting surface 6104 (shown here as cutting surfaces 6104a, 6104b) oriented along the length 110 of the first elongated member 102 and the length 118 of the second elongated member 104. Each cutting surface 6104a, 6104b of the fifth pair of cutting members 6102a, 6102b is presented toward the other cutting surface 6104a, 6104b of the fifth pair of cutting members 6102a, 6102b.

As shown in FIGS. 6-7, the cutting surfaces 6104 of the fifth pair of cutting members 6102a, 6102b move toward one another upon pivotal movement of the first and second elongated members 102, 104 about the pivot axis 234 relative to each other such that the proximal end 106 of the first elongated member 102 and the proximal end 114 of the second elongated member 104 move toward one another as the electrical cable stripping and cutting tool 100 is moved toward the closed position. The fifth pair of cutting members 6102a, 6102b is formed and/or positioned such that the cutting surfaces 6104a, 6104b of the fifth pair of cutting members 6102a, 6102b will pass by one another in close proximity to one another as the electrical cable stripping and cutting tool 100 is moved toward the closed position. The cutting surfaces 6104a, 6104b of the fifth pair of cutting members 6102a, 6102b are shaped and dimensioned to cut through an individual conductor insulation having a second insulation dimension, which is smaller than the first insulation dimension, covering one electrical conductor without cutting the one electrical conductor when at least a portion of the one electrical conductor covered by the individual conductor insulation extends laterally between the fifth pair of cutting members 6102a, 6102b.

Because the fourth pair of cutting members 698 is designed to cut through an individual conductor insulation having a first insulation dimension, and the fifth pair of cutting members 6102 is designed to cut through an individual conductor insulation having a second insulation dimension, the electrical cable stripping and cutting tool 100 provides a user with the ability to cut through individual conductor insulations having the first insulation dimension and through individual conductor insulations having the second insulation dimension without having to use two separate tools. For example, the fourth pair of cutting members 698 may be at least partially shaped and dimensioned to cut through an individual conductor insulation surrounding a 12 Gauge electrical conductor, and the fifth pair of cutting members 6102 may be at least partially shaped and dimensioned to cut through an individual conductor insulation surrounding a 14 Gauge electrical conductor. The individual conductor insulation surrounding a 12 Gauge electrical conductor is typically larger than the individual conductor insulation surrounding a 14 Gauge electrical conductor because 12 Gauge electrical conductors have a larger diameter than 14 Gauge electrical conductors. In such case, the electrical cable stripping and cutting tool 100 is applicable to cut through the individual conductor insulation surrounding a 12 Gauge electrical conductor, using the fourth pair of cutting members 698, and through the individual conductor insulation surrounding a 14 Gauge electrical conductor, using the fifth pair of cutting members 6102. Although the individual conductor insulation surrounding 12 and 14 Gauge electrical conductors have been described above as being cut by the fourth and fifth pairs of cutting members 698, 6102, respectively, the fourth and fifth pairs of cutting members 698, 6102 may be at least partially shaped and dimensioned to cut through the individual conductor insulation of any desired gauged electrical conductor.

The third pair of cutting members 694, the fourth pair of cutting members 698, and the fifth pair of cutting members 6102 may be longitudinally parallel and adjacent to one another on the first and second elongated members 102, 104. The third, the fourth, and the fifth pairs of cutting members 694, 698, 6102 may be perpendicularly positioned between the first and second sides 140, 142, 150, 152 of the first and second face plates 140, 146 (FIG. 5).

Figure 8:
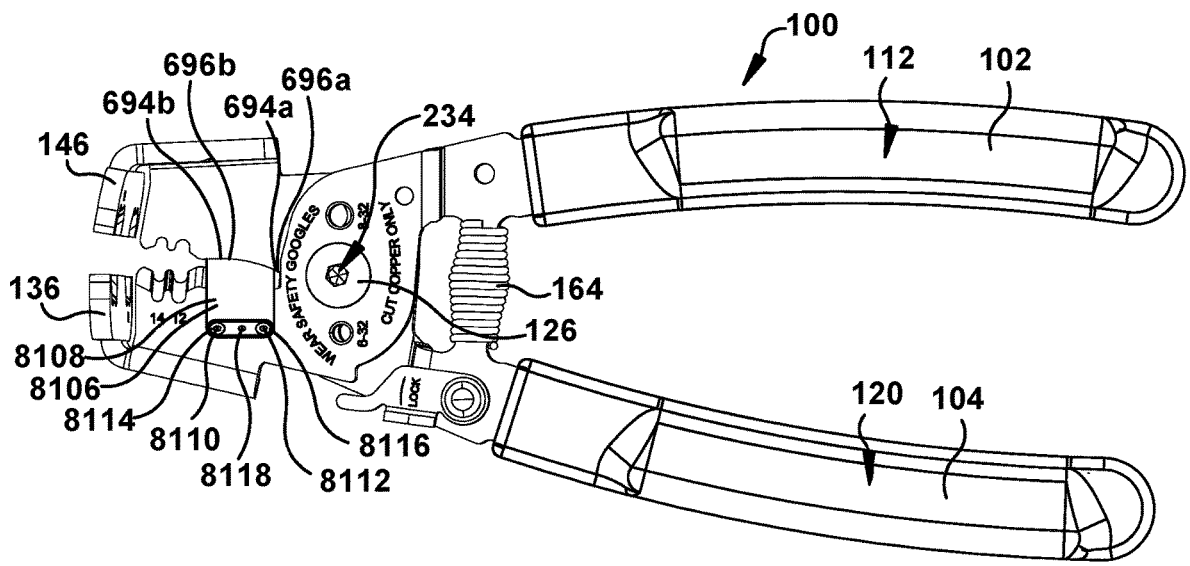
FIGS. 8-14 schematically illustrate an example sequence of operation of the aspect of FIG. 1.

In use, the electrical cable stripping and cutting tool 100, as described above, is provided to a user. The electrical cable stripping and cutting tool 100 may be used as a hand tool to strip and cut a non-metallic electrical cable, such as Romex® cable. As shown in FIG. 8, such electrical cable 8106 includes a non-metallic outer sheath 8108, typically formed from an electrically-insulating polyvinyl chloride material. The outer sheath 8108 surrounds multiple individual electrical conductors, such as conductors 8110 and 8112, which are insulated from each other. More particularly, the conductor 8110 is surrounded by individual conductor insulation 8114, and the conductor 8112 is surrounded by individual conductor insulation 8116. Also surrounded by the outer sheath 8108 is a bare ground wire or conductor 8118 without individual conductor insulation, which is disposed between the conductors 8110 and 8112. Each of the conductors 8110, 8112, 8118 may be, for example, a single, solid strand of metal, such as copper or aluminum, or a strand fabricated from several metal filaments twisted or braided together. As shown, each of the conductors 8110, 8112, 8118 has a circular cross-section, and each of the conductors 8110, 8112 is surrounded by circular cross-section individual conductor insulation 8114, 8116. The conductors 8110, 8112, 8118 are commonly referred to as wires.

The electrical cable 8106, as described above, is provided to the user. The electrical cable stripping and cutting tool 100 is moved to an open position. The first and second elongated members 102, 104 may be spread apart under the bias of the biasing member 164 to move the electrical cable stripping and cutting tool 100 into the open position. If the user desires to shear-cut the electrical cable 8106 to remove a portion of the electrical cable, as shown in FIG. 8, at least a portion of the electrical cable 8106 is placed longitudinally between the third pair of cutting members 694a, 694b.

Figure 9:
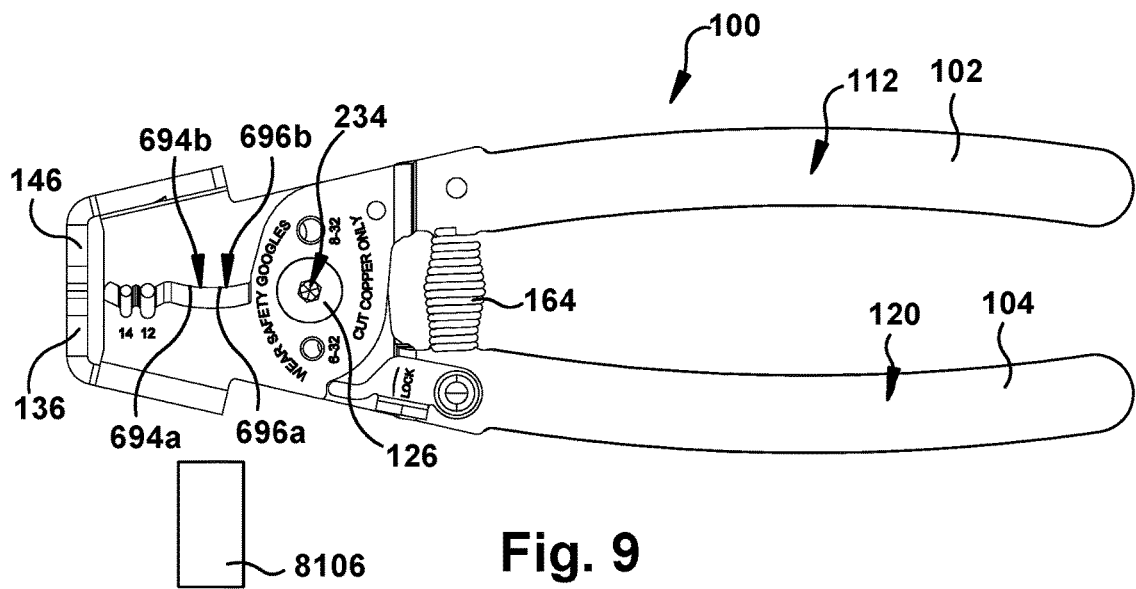

As shown in FIGS. 8-9, with the electrical cable 8106 longitudinally between the third pair of cutting members 694a, 694b, a portion of the electrical cable 8106 is cut at least partially through by moving the electrical cable stripping and cutting tool 100 toward the closed position. A force may be applied to the handle portions 112, 120 of the first and second elongated members 102, 104 to move the electrical cable stripping and cutting tool 100 into the closed position. The force applied to the handle portions 112, 120 of the first and second elongated members 102, 104 causes the handle portions 112, 120 to move together, the first and second elongated members 102, 104 to pivot about the pivot axis 234, and the first and second face plates 136, 146 to move together. The motion of the electrical cable stripping and cutting tool 100 toward the closed position causes the cutting surfaces 696a, 696b of the third pair of cutting members 694a, 694b to move together over the electrical cable 8106 to shear-cut at least partially through a portion of the electrical cable 8106. FIG. 9 also depicts the portion of the electrical cable 8106 that was separated from the remainder of the electrical cable 8106 after a portion of the electrical cable was shear-cut.

If the user desires to cut and strip at least a portion of the outer sheath 8108 from the electrical cable 8106, the user may place at least a portion of the electrical cable 8106 between one of the first pair of cutting members 156a, 156b and the second pair of cutting members 160a, 160b depending on the dimensions of the outer sheath 8108 of the electrical cable 8106. For example, if the electrical cable 8106 is a 12/2 Gauge electrical cable 8106 and the cutting surfaces 158a, 158b of the first pair of cutting members 156a, 156b are dimensioned to cut through the outer sheath 8108 of a 12/2 Gauge electrical cable 8106, at least a portion of the electrical cable 8106 may be placed longitudinally between the first pair of cutting members 156a, 156b. If the electric cable 8106 is a 14/2 Gauge electrical cable 8106 and the cutting surfaces 162a, 162b of the second pair of cutting members 160a, 160b is dimensioned to cut through the outer sheath 8108 of a 14/2 Gauge electrical cable 8106, at least a portion of the electrical cable 8106 may be placed longitudinally between the second pair of cutting members 160a, 160b.

Figure 10:
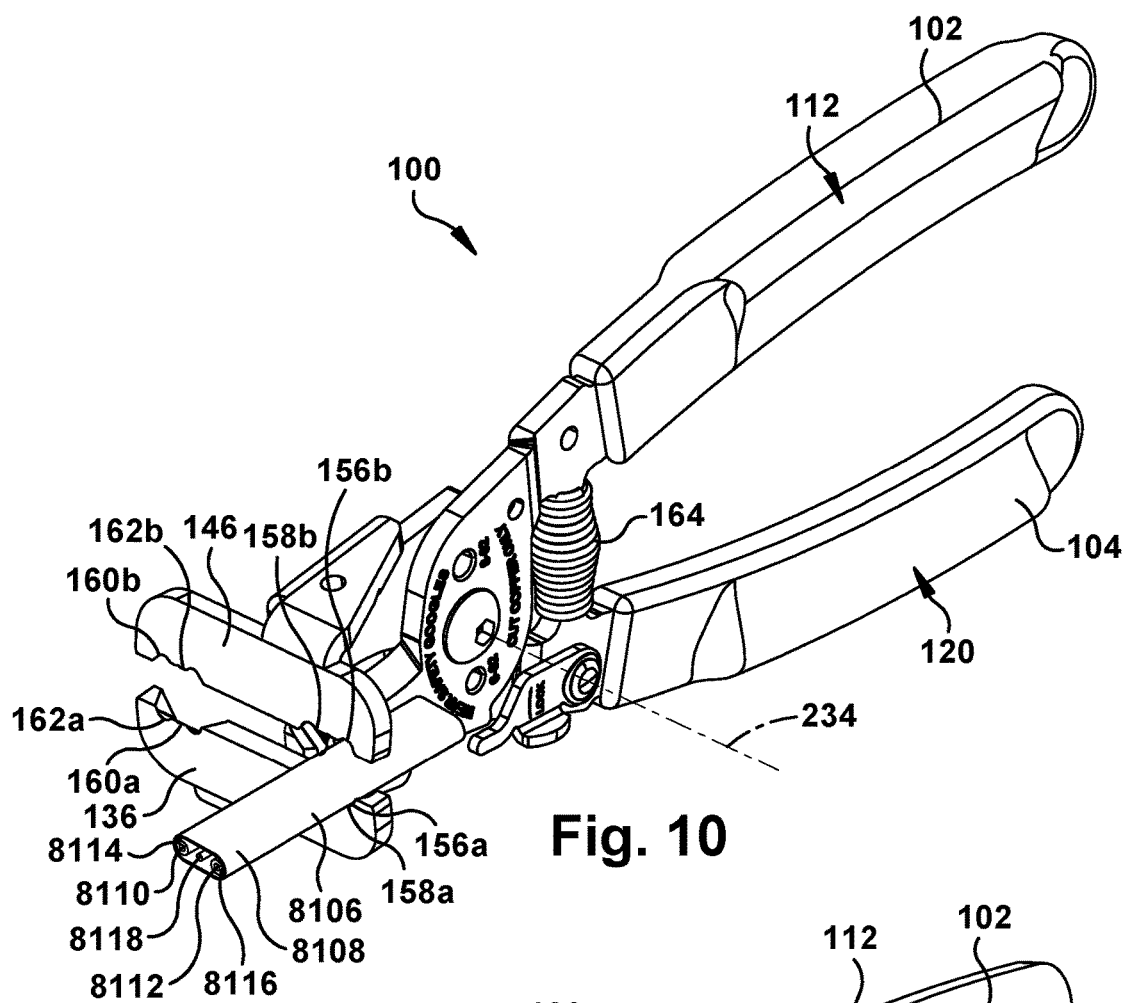
Figure 11:
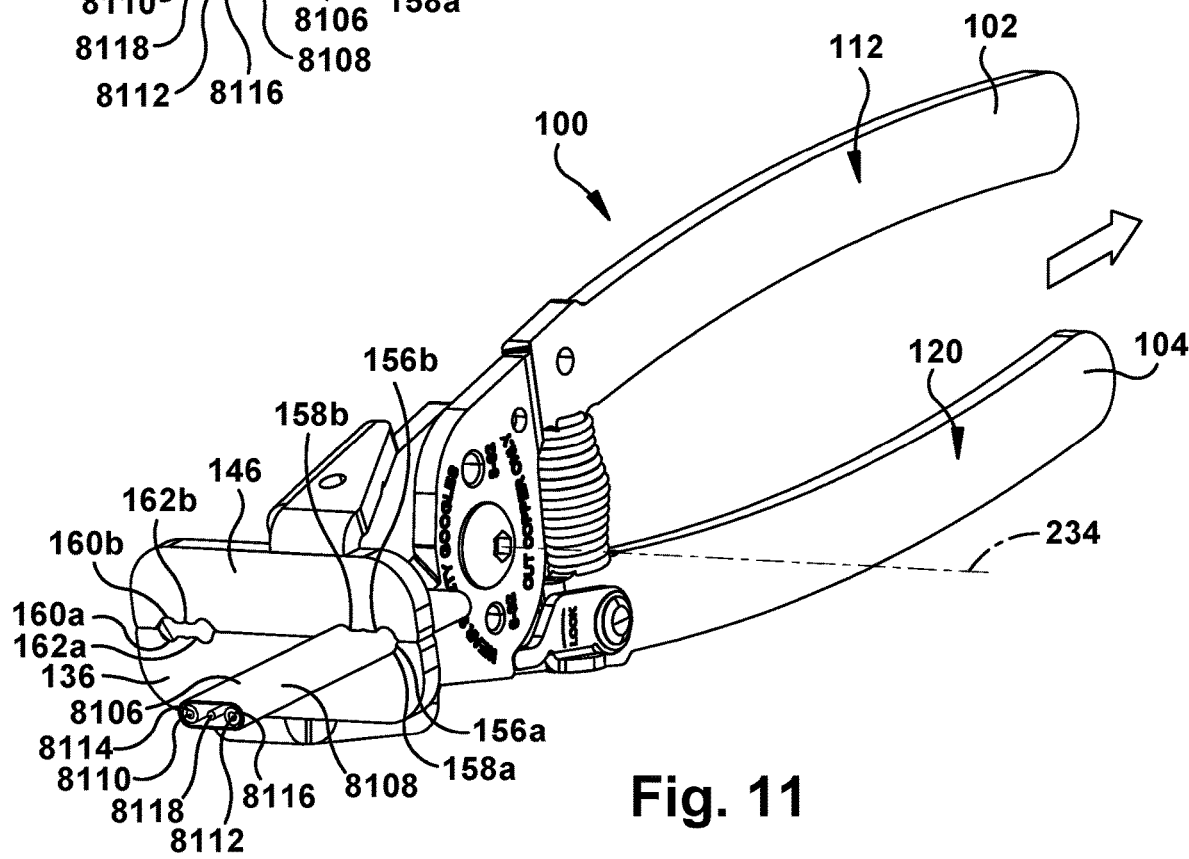

Accordingly, if the user desires to cut and strip at least a portion of the outer sheath 8108 from the electrical cable 8106, the user first determines the dimensions of the electrical cable 8106, such as by determining whether the electrical cable 8106 has the first sheath dimension or the second sheath dimension. Upon determining that the electrical cable 8106 has the first sheath dimension, at least a portion of the electrical cable 8106 having the first sheath dimension is placed longitudinally between the first pair of cutting members 156a, 156b, as shown in FIG. 10. As shown in FIGS. 10-11, with the electrical cable 8106 having the first sheath dimension longitudinally between the first pair of cutting members 156a, 156b, a portion of the outer sheath 8108 is cut at least partially through by moving the electrical cable stripping and cutting tool 100 toward the closed position. The motion of the electrical cable stripping and cutting tool 100 toward the closed position causes the cutting surfaces 158a, 158b of the first pair of cutting members 156a, 156b to move together over the electrical cable 8106 to cut at least partially through a portion of the outer sheath 8108 of the electrical cable 8106.

The cut portion of the outer sheath 8108 is removed from the electrical cable 8106 to expose a portion of the bare ground wire or conductor 8118 and a portion of each of the individual conductor insulations 8114, 8116 covering each of the conductors 8110, 8112. For example, with at least a portion of the electrical cable 8106 between the first pair of cutting members 156a, 156b and the electrical cable stripping and cutting tool 100 in the closed position, the electrical cable 8106 may be held stationary and the electrical cable stripping and cutting tool 100 may be longitudinally moved in the longitudinally proximal direction (shown as an arrow in FIG. 11) with respect to the electrical cable 8106 to at least partially urge the cut portion of the outer sheath 8108 longitudinally in the longitudinally proximal direction with respect to the electrical cable 8106. Instead of longitudinally moving the electrical cable stripping and cutting tool 100 is in the longitudinally proximal direction, the cut portion of the outer sheath 8108 may be pulled off from the electrical cable 8106 by the user to expose a portion of the bare ground wire or conductor 8118 and a portion of each of the individual conductor insulations 8114, 8116 covering each of the conductors 8110, 8112. The electrical cable stripping and cutting tool 100 is then moved to the open position.

Alternatively, upon determining that the electrical cable 8106 has the second sheath dimension, at least a portion of the electrical cable 8106 having the second sheath dimension is placed longitudinally between the second pair of cutting members 160a, 160b. With the electrical cable 8106 having the second sheath dimension longitudinally between the second pair of cutting members 160a, 160b, a portion of the outer sheath 8108 is cut at least partially through by moving the electrical cable stripping and cutting tool 100 toward the closed position. The motion of the electrical cable stripping and cutting tool 100 toward the closed position causes the cutting surfaces 162a, 162b of the second pair of cutting members 160a, 160b to move together over the electrical cable 8106 to cut at least partially through a portion of the outer sheath 8108 of the electrical cable 8106. The cut portion of the outer sheath 8108 is removed from the electrical cable 8106 to expose a portion of the bare ground wire or conductor 8118 and a portion of each of the individual conductor insulations 8114, 8116 covering each of the conductors 8110, 8112, in a similar sequence as described above.

If the user desires to cut and strip at least a portion of one of the exposed individual conductor insulation 8114, 8116 covering a corresponding conductor 8110, 8112, the user may place at least a portion of that one exposed individual conductor insulation 8114, 8116 between one of the fourth pair of cutting members 698a, 698b and the fifth pair of cutting members 6102a, 6102b depending on the dimensions of the one exposed individual conductor insulation 8114, 8116 covering the corresponding conductor 8110, 8112. For example, if the corresponding conductor 8110, 8112 is a 12 Gauge conductor 8110, 8112 and the cutting surfaces 6100a, 6100b of the fourth pair of cutting members 698a, 698b are dimensioned to cut through the exposed individual conductor insulation 8114, 8116 covering the 12 Gauge conductor 8110, 8112, at least a portion of the exposed individual conductor insulation 8114, 8116 covering the corresponding conductor 8110, 8112 is placed laterally between the fourth pair of cutting members 698a, 698b. If the corresponding conductor 8110, 8112 is a 14 Gauge conductor 8110, 8112 and the cutting surfaces 6104a, 6104b of the fifth pair of cutting members 6102a, 6102b are dimensioned to cut through the exposed individual conductor insulation 8114, 8116 covering the 14 Gauge conductor 8110, 8112, at least a portion of the exposed individual conductor insulation 8114, 8116 covering the corresponding conductor 8110, 8112 is placed laterally between the fifth pair of cutting members 6102a, 6102b.

Figure 12A:
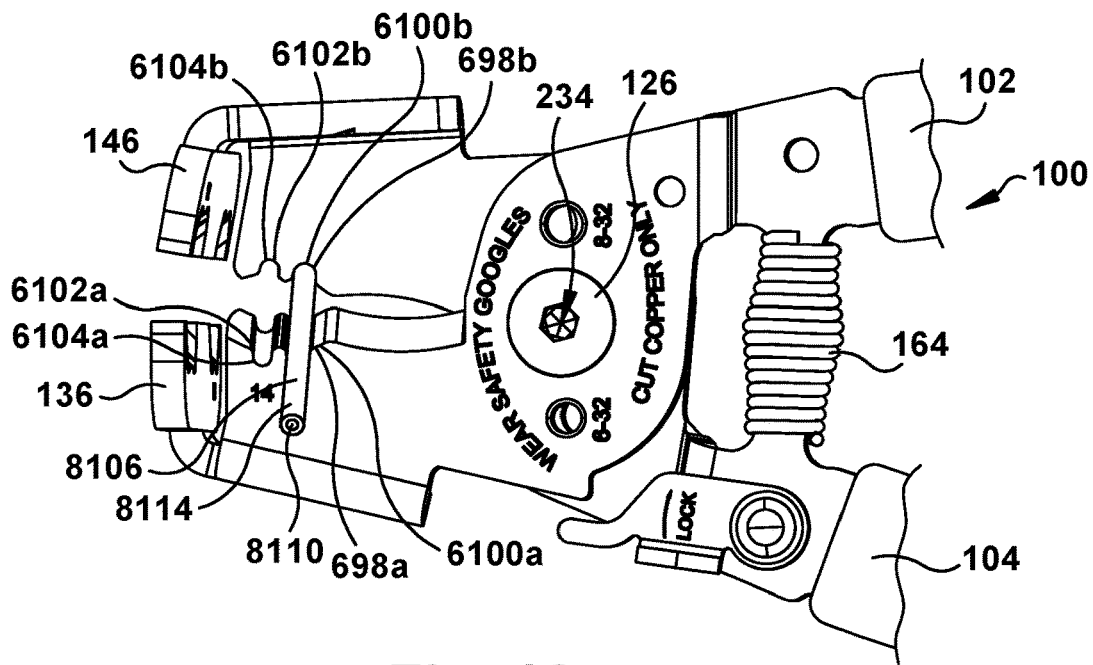
Figure 12B:
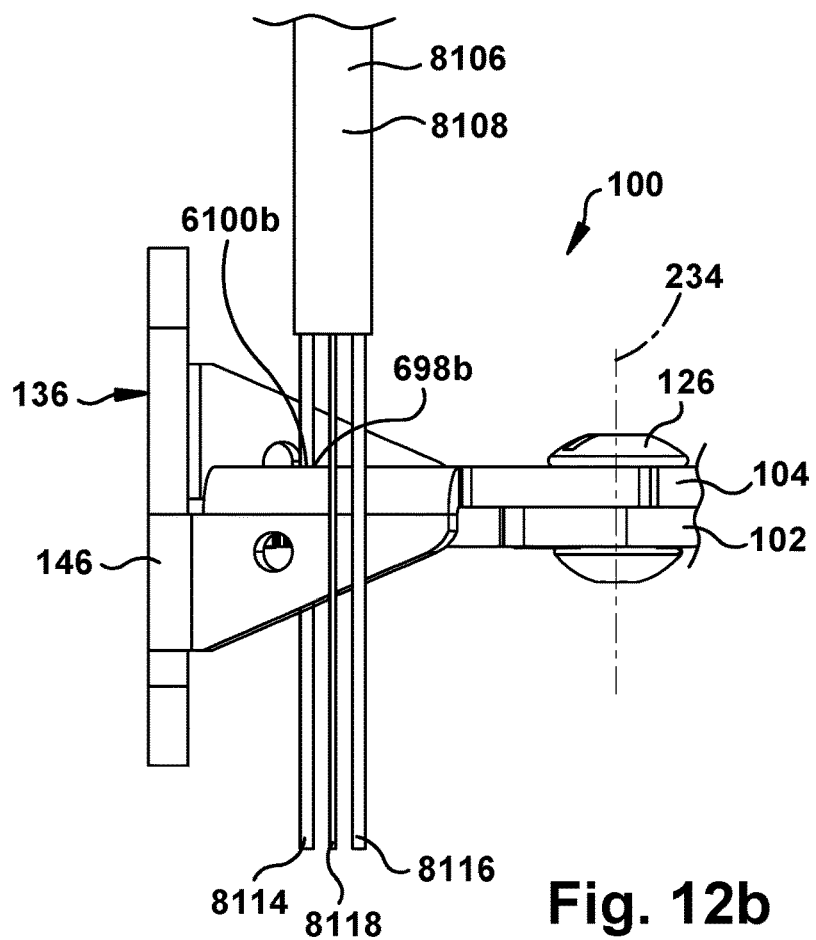

Accordingly, if the user desires to cut and strip at least a portion of one of the exposed individual conductor insulation 8114, 8116 covering a corresponding conductor 8110, 8112, the user first determines the dimensions of the electrical cable 8106, such as by determining whether the exposed individual conductor insulation 8114, 8116 has the first insulation dimension or the second insulation dimension. Upon determining that the electrical cable 8106 has the first insulation dimension, at least a portion of one of the exposed individual conductor insulation 8114, 8116 (shown here as a first individual conductor insulation 8114) having the first insulation dimension and covering a corresponding conductor 8110, 8112 (shown here as the conductor 8110) is placed laterally between the fourth pair of cutting members 698a, 698b, as shown in FIGS. 12a-12b. As shown in FIGS.

12a-13b, with the exposed individual conductor insulation 8114 portion of the electrical cable 8106 between the fourth pair of cutting members 698a, 698b, a portion of the individual conductor insulation 8114 is cut at least partially through by moving the electrical cable stripping and cutting tool 100 toward the closed position. The motion of the electrical cable stripping and cutting tool 100 toward the closed position causes the cutting surfaces 6100a, 6100b of the fourth pair of cutting members 698a, 698b to move together over the exposed individual conductor insulation 8114 portion of the electrical cable 8106 to cut at least partially through a portion of the individual conductor insulation 8114 covering the corresponding electrical conductor 8110.

Figure 13A:
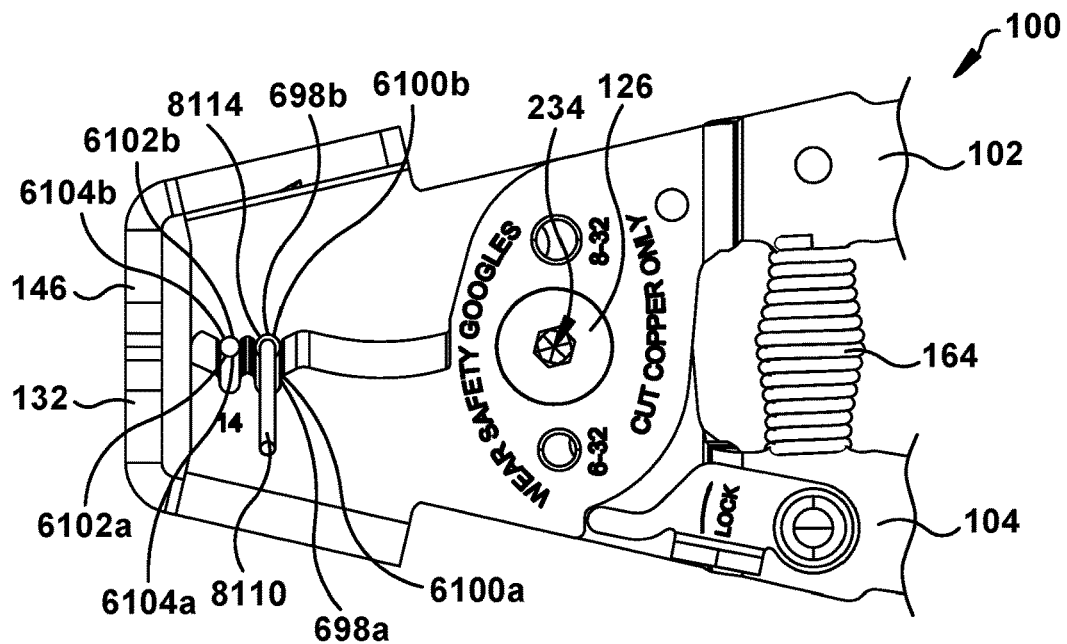
Figure 13B:
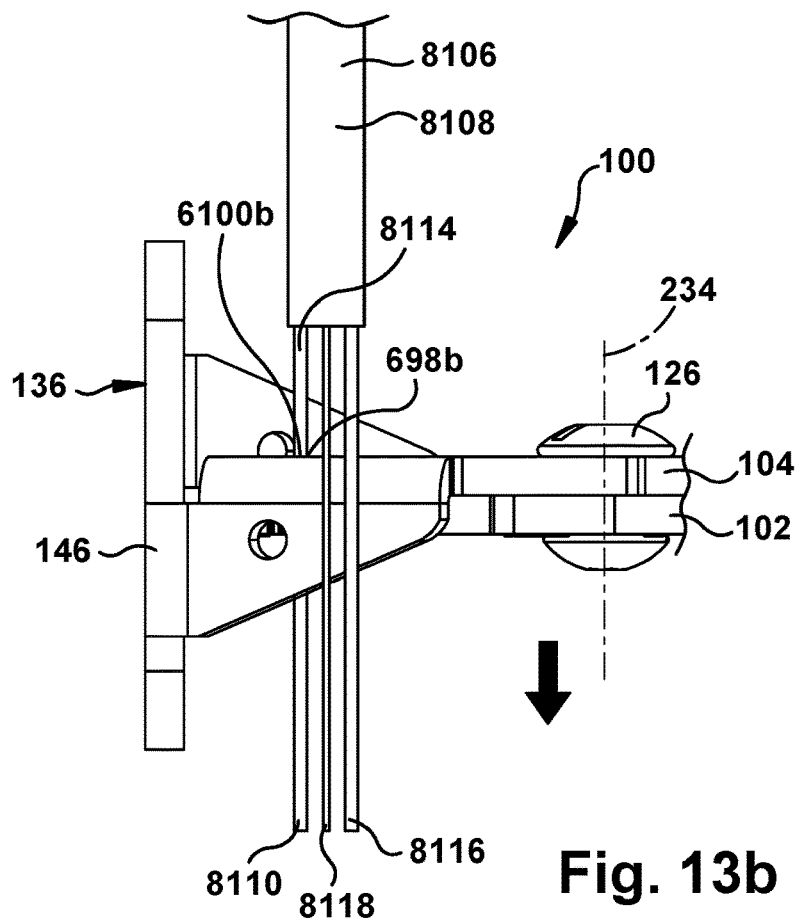

The cut portion of the individual conductor insulation 8114 is removed from the electrical cable 8106 to expose the corresponding conductor 8110. For example, with the exposed individual conductor insulation 8114 portion of the electrical cable 8106 between the fourth pair of cutting members 698a, 698b and the electrical cable stripping and cutting tool 100 in the closed position, the electrical cable 8106 is held stationary and the electrical cable stripping and cutting tool 100 is laterally moved in a laterally proximal direction (shown as an arrow in FIG. 13b) with respect to the electrical cable 8106 to at least partially urge the cut portion of the individual conductor insulation 8114 laterally in the laterally proximal direction with respect to the electrical cable 8106. Instead of laterally moving the electrical cable stripping and cutting tool 100 is in the laterally proximal direction, the cut portion of the individual conductor insulation 8114 may be pulled off from the electrical cable 8106 by the user to expose the corresponding conductor 8110. The electrical cable stripping and cutting tool 100 is then moved to the open position.

Alternatively, upon determining that the electrical cable has the second insulation dimension, at least a portion of one of the exposed individual conductor insulation 8114, 8116 having the second insulation dimension and covering a corresponding conductor 8110, 8112 is placed laterally between the fifth pair of cutting members 6102a, 6102b. With the exposed individual conductor insulation 8114, 8116 portion of the electrical cable 8106 between the fifth pair of cutting members 6102a, 6102b, a portion of the individual conductor insulation 8114, 8116 is cut at least partially through by moving the electrical cable stripping and cutting tool 100 toward the closed position. The motion of the electrical cable stripping and cutting tool 100 toward the closed position causes the cutting surfaces 6104a, 6104b of the fifth pair of cutting members 6102a, 6102b to move together over the exposed individual conductor insulation 8114, 8116 portion of the electrical cable 8106 to cut at least partially through a portion of the individual conductor insulation 8114, 8116 covering the corresponding electrical conductor 8110, 8112. The cut portion of the outer sheath 8108 is removed from the electrical cable 8106 to expose a portion of the bare ground wire or conductor 8118 and a portion of each of the individual conductor insulations 8114, 8116 covering each of the conductors 8110, 8112, in a similar sequence as described above.

With the electrical cable 8106 having the second sheath dimension longitudinally between the second pair of cutting members 160a, 160b, a portion of the outer sheath 8108 is cut at least partially through by moving the electrical cable stripping and cutting tool 100 toward the closed position. The motion of the electrical cable stripping and cutting tool 100 toward the closed position causes the cutting surfaces 162a, 162b of the second pair of cutting members 160a, 160b to move together over the electrical cable 8106 to cut at least partially through a portion of the outer sheath 8108 of the electrical cable 8106. The cut portion of the individual conductor insulation 8114, 8116 is removed from the electrical cable 8106 to expose the corresponding conductor 8110, 8112, in a similar sequence as described above.

After one of the exposed individual conductor insulation 8114, 8116 covering a corresponding conductor 8110, 8112 has been cut in the manner as described above, if the user then desires to cut and strip at least a portion of any of the remaining uncut, unstripped, and exposed individual conductor insulation 8114, 8116 covering a corresponding conductor 8110, 8112, the user may utilize one of the fourth pair of cutting members 698a, 698b and the fifth pair of cutting members 6102a, 6102b, depending on the dimensions of the one individual conductor insulation 8114, 8116 covering the corresponding conductor 8110, 8112, to cut and strip the desired individual conductor insulation 8114, 8116 in a similar sequence of operation as described above.

Figure 14:
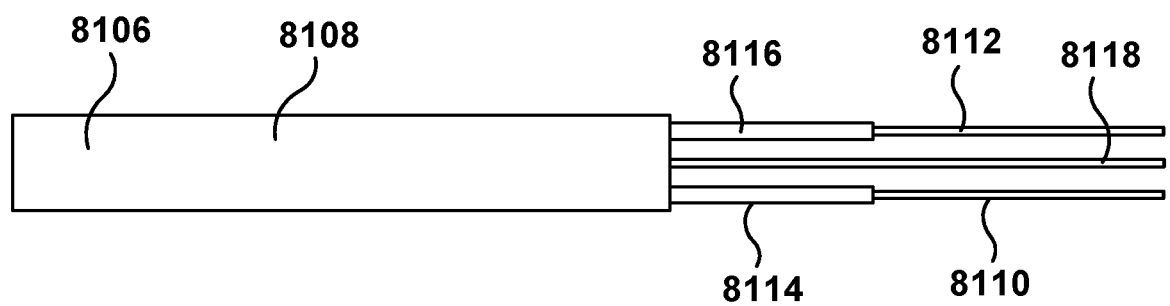

FIG. 14 depicts the electrical cable 8106 after the user has utilized the electrical cable stripping and cutting tool 100 to shear-cut the electrical cable 8106 to remove a portion of the electrical cable 8106, to cut and strip at least a portion of the outer sheath 8108 from the electrical cable 8106, and to cut and strip at least of portion of the exposed individual conductor insulation 8114, 8116 covering the conductors 8110, 8112. As can be seen, a portion of the bare ground wire or conductor 8118 and a portion of the each of the conductors 8110, 8112 are exposed. If the user desires, the user may then shear-cut any remaining portion of the electrical cable 8106 with the third pair of cutting members 694a, 694b in a similar sequence as described above.

Although the electrical cable stripping and cutting tool 100 has been described as cutting and stripping an electrical cable 8106 having a non-metallic outer sheath 8108 that surrounds multiple individual electrical conductors 8110, 8112, which are insulated from each other, and a bare ground wire or conductor 8118, the electrical cable stripping and cutting tool 100 may be configured and/or utilized to cut and strip any desired electrical cable.

The first and second elongated members 102, 104, the locking mechanism 568, the first and second first face plates 136, 146, the first and second connection elements 586, 588, when provided, the fastener 126, and/or the biasing member 164, can each be at least partially formed from silicone, polyethylene, polypropylene, steel, titanium, any other suitable material, or any combination thereof.

The electrical cable stripping and cutting tool 100 assists the user in cutting and stripping the outer sheath 8108 of an electrical cable 8106 without cutting, nicking, or otherwise damaging the conductors 8110, 8112, 8118 or the individual conductor insulation 8114, 8116, and after removing the outer sheath 8108, cutting and stripping the individual conductor insulation 8114, 8116 on the conductors 8110, 8112 without cutting, nicking, or otherwise damaging the conductors 8110, 8112, 8116 in a multiple-stroke process without the need of additional tools.

Although the first and second face plates 136, 146 have been described as having the first and second pairs of cutting members 156a, 156b, 160a, 160b for cutting the outer sheath of an electrical cable, it is contemplated that the first and second face plates 136, 146 may have more than two pairs of cutting members for cutting through the outer sheath of an electrical cable to allow for cutting surfaces with different dimensions than those of the first and second pairs of cutting members 156a, 156b, 160a, 160b.

Although the first and second elongated members 102, 104 have been described as having the fourth and fifth pairs of cutting members 698a, 698b, 6102a, 6102b for cutting through the individual conductor insulation, it is contemplated that the first and second elongated members 102, 104 may have more than two pairs of cutting members for cutting through the individual conductor insulation to allow for cutting surfaces with different dimensions than those of the fourth and fifth pairs of cutting members 698a, 698b, 6102a, 6102b. Additionally, it is contemplated that the electrical cable cutting and stripping tool 100 may have more than the five pairs of cutting members described above.

It is contemplated that the offset portions 122, 124 of the first and second elongated members 102, 104 may include more openings than the openings 125, 127 for allowing the first and second elongated members 102, 104 to be fit together in several configurations for stripping and cutting different sized electrical cables.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. An electrical cable stripping and cutting tool, the electrical cable including an outer sheath radially surrounding at least one electrical conductor which is radially surrounded by individual conductor insulation, the tool comprising:
    a first elongated member having a proximal end and a longitudinally opposite distal end;
    a second elongated member having a proximal end and a longitudinally opposite distal end, the second elongated member being joined to the first elongated member such that the first and second elongated members are pivotable about a laterally extending pivot axis relative to each other;
    a first face plate attached to the distal end of the first elongated member, the first face plate being oriented substantially perpendicular to a longitudinal axis of the first elongated member, the first face plate having a first side and a laterally opposite second side;
    a second face plate attached to the distal end of the second elongated member, the second face plate being oriented substantially perpendicular to a longitudinal axis of the second elongated member, the second face plate having a first side and a laterally opposite second side, in a closed position of the electrical cable stripping and cutting tool, the first side of the first face plate abutting the first side of the second face plate, the second side of the first face plate abutting the second side of the second face plate, and the first and second face plates collectively forming a single flat face plate;
    a first pair of cutting members formed on the first side of the first and second face plates, each of the first pair of cutting members having a cutting surface presented toward the other cutting surface of the first pair of cutting members; and
    a second pair of cutting members formed on the second side of the first and second face plates, each of the second pair of cutting members having a cutting surface presented toward the other cutting surface of the second pair of cutting members; wherein
    the cutting surfaces of the first pair of cutting members are shaped and dimensioned to cut through an outer sheath of an electrical cable having a first sheath dimension without cutting the individual conductor insulation covering the at least one electrical conductor and without cutting the at least one electrical conductor when at least a portion of the electrical cable having the outer sheath with the first sheath dimension extends longitudinally between the first pair of cutting members, and
    the cutting surfaces of the second pair of cutting members are shaped and dimensioned to cut through an outer sheath of an electrical cable having a second sheath dimension without cutting the individual conductor insulation covering the at least one electrical conductor and without cutting the at least one electrical conductor when at least a portion of the electrical cable having the outer sheath with the second sheath dimension extends longitudinally between the first pair of cutting members, the second sheath dimension being smaller than the first sheath dimension.

2. The electrical cable stripping and cutting tool of claim 1, wherein one of the first pair of cutting members is formed on one of the first and second face plates, the other of the first pair of cutting members being formed on the other of the first and second face plates, each of the first pair of cutting members having the cutting surface oriented lateral to the longitudinal axis of the first elongated member and the longitudinal axis of the second elongated member, the cutting surfaces of the first pair of cutting members moving toward one another upon pivotal movement of the first and second elongated members about the pivot axis relative to each other such that the proximal end of the first elongated member and the proximal end of the second elongated member move toward one another as the electrical cable stripping and cutting tool is moving toward the closed position.

3. The electrical cable stripping and cutting tool of claim 2, wherein one of the second pair of cutting members is formed on one of the first and second face plates, the other of the second pair of cutting members being formed on the other of the first and second face plates, each of the second pair of cutting members having the cutting surface oriented lateral to the longitudinal axis of the first elongated member and the longitudinal axis of the second elongated member, the cutting surfaces of the second pair of cutting members moving toward one another upon pivotal movement of the first and second elongated members about the pivot axis relative to each other such that the proximal end of the first elongated member and the proximal end of the second elongated member move toward one another as the electrical cable stripping and cutting tool is moving toward the closed position.

4. The electrical cable stripping and cutting tool of claim 1, wherein the first and second face plates are each attached to a first connection end of first and second connection elements, respectively, a second connection end of the first and second connection elements being attached to the distal end of the first and second elongated members, respectively.

5. The electrical cable stripping and cutting tool of claim 4, wherein the first face plate, the first elongated member, and the first connection element are integrally manufactured as a single piece, and the second face plate, the second elongated member, and the second connection element are integrally manufactured as a single piece.

6. The electrical cable stripping and cutting tool of claim 1, including a third pair of cutting members formed on the first and second elongated members, one of the third pair of cutting members being formed on one of the first and second elongated members, the other of the third pair of cutting members being formed on the other of the first and second elongated members, each of the third pair of cutting members having a cutting surface oriented along a length of the first elongated member and a length of the second elongated member, the length of the first elongated member extending from the proximal end of the first elongated member to the distal end of the first elongated member, the length of the second elongated member extending from the proximal end of the second elongated member to the distal end of the second elongated member, each cutting surface of the third pair of cutting members being presented toward the other cutting surface of the third pair of cutting members, the cutting surfaces of the third pair of cutting members each being shaped and dimensioned for collectively shear cutting the electrical cable when at least a portion of the electrical cable extends laterally between the third pair of cutting members.

7. The electrical cable stripping and cutting tool of claim 6, wherein he cutting surfaces of the third pair of cutting members move toward one another upon pivotal movement of the first and second elongated members about the pivot axis relative to each other such that the proximal end of the first elongated member and the proximal end of the second elongated member move toward one another as the electrical cable stripping and cutting tool is moving toward the closed position.

8. The electrical cable stripping and cutting tool of claim 6, including a fourth pair of cutting members formed on the first and second elongated members, one of the fourth pair of cutting members being formed on one of the first and second elongated members, the other of the fourth pair of cutting members being formed on the other of the first and second elongated members, each of the fourth pair of cutting members having a cutting surface oriented along the length of the first elongated member and the length of the second elongated member, each cutting surface of the fourth pair of cutting members being presented toward the other cutting surface of the fourth pair of cutting members, the cutting surfaces of the fourth pair of cutting members being shaped and dimensioned to cut through the individual conductor insulation covering one electrical conductor without cutting the one electrical conductor when at least a portion of the one electrical conductor covered by the individual conductor insulation extends laterally between the fourth pair of cutting members.

9. The electrical cable stripping and cutting tool of claim 8, wherein the cutting surfaces of the fourth pair of cutting members move toward one another upon pivotal movement of the first and second elongated members about the pivot axis relative to each other such that the proximal end of the first elongated member and the proximal end of the second elongated member move toward one another as the electrical cable stripping and cutting tool is moving toward the closed position.

10. The electrical cable stripping and cutting tool of claim 8, including a fifth pair of cutting members formed on the first and second elongated members, one of the fifth pair of cutting members being formed on one of the first and second elongated members, the other of the fifth pair of cutting members being formed on the other of the first and second elongated members, each of the fifth pair of cutting members having a cutting surface oriented along the length of the first elongated member and the length of the second elongated member, each cutting surface of the fifth pair of cutting members being presented toward the other cutting surface of the fifth pair of cutting members, the cutting surfaces of the fifth pair of cutting members being shaped and dimensioned to cut through the individual conductor insulation covering one electrical conductor without cutting the one electrical conductor when at least a portion of the one electrical conductor covered by the individual conductor insulation extends laterally between the fifth pair of cutting members, wherein the cutting surfaces of the fourth pair of cutting members are shaped and dimensioned to cut through an individual conductor insulation having a first insulation dimension and the cutting surfaces of the fifth pair of cutting members are shaped and dimensioned to cut through an individual conductor insulation having a second insulation dimension, the first insulation dimension being larger than the second insulation dimension.

11. The electrical cable stripping and cutting tool of claim 10, wherein the cutting surfaces of the fifth pair of cutting members move toward one another upon pivotal movement of the first and second elongated members about the pivot axis relative to each other such that the proximal end of the first elongated member and the proximal end of the second elongated member move toward one another as the electrical cable stripping and cutting tool is moving toward the closed position.

12. The electrical cable stripping and cutting tool of claim 10, wherein the third pair of cutting members, the fourth pair of cutting members, and the fifth pair of cutting members are longitudinally parallel and adjacent to one another, the third, the fourth, and the fifth pairs of cutting members being perpendicularly positioned between the first and second sides of the first and second face plates.

13. The electrical cable stripping and cutting tool of claim 1, including a biasing member extending between the first and second elongated members, the biasing member biasing the electrical cable stripping and cutting tool toward an open position.

14. The electrical cable stripping and cutting tool of claim 13, wherein the biasing member is a spring.

15. The electrical cable stripping and cutting tool of claim 13, including a locking mechanism being positioned on at least one of the first and second elongated members, wherein after the first and second elongated members are pivoted about the pivot axis relative to each other such that the electrical cable stripping and cutting tool is moved from the open position to the closed position, the locking mechanism is actuatable to maintain the electrical cable stripping and cutting tool in the closed position.

16. A method for cutting and stripping an electrical cable, the method comprising:
    providing an electrical cable including an outer sheath surrounding at least one electrical conductor covered with individual conductor insulation;
    providing an electrical cable stripping and cutting tool, including
        a first elongated member having a proximal end and a longitudinally opposite distal end,
        a second elongated member having a proximal end and a longitudinally opposite distal end, the second elongated member being joined to the first elongated member such that the first and second elongated members are pivotable about a laterally extending pivot axis relative to each other,
        a first face plate attached to the distal end of the first elongated member, the first face plate being oriented substantially perpendicular to a longitudinal axis of the first elongated member, the first face plate having a first side and a laterally opposite second side,
        a second face plate attached to the distal end of the second elongated member, the second face plate being oriented substantially perpendicular to a longitudinal axis of the second elongated member, the second face plate having a first side and a laterally opposite second side, in a closed position of the electrical cable stripping and cutting tool, the first side of the first face plate abutting the first side of the second face plate, the second side of the first face plate abutting the second side of the second face plate, and the first and second face plates collectively forming a single flat face plate,
        a first pair of cutting members formed on the first side of the first and second face plates, each of the first pair of cutting members having a cutting surface presented toward the other cutting surface of the first pair of cutting members, and
        a second pair of cutting members formed on the second side of the first and second face plates, each of the second pair of cutting members having a cutting surface presented toward the other cutting surface of the second pair of cutting members,
        the cutting surfaces of the first pair of cutting members being shaped and dimensioned to cut through an outer sheath of an electrical cable having a first sheath dimension without cutting the individual conductor insulation covering the at least one electrical conductor and without cutting the at least one electrical conductor when at least a portion of the electrical cable having the outer sheath with the first sheath dimension extends longitudinally between the first pair of cutting members, and
        the cutting surfaces of the second pair of cutting members being shaped and dimensioned to cut through an outer sheath of an electrical cable having a second sheath dimension without cutting the individual conductor insulation covering the at least one electrical conductor and without cutting the at least one electrical conductor when at least a portion of the electrical cable having the outer sheath with the second sheath dimension extends longitudinally between the first pair of cutting members, the second sheath dimension being smaller than the first sheath dimension;
    moving the electrical cable stripping and cutting tool to an open position;
    determining whether the electrical cable has the first sheath dimension or the second sheath dimension;
    when it is determined that the electrical cable has the first sheath dimension, removing a cut portion of the outer sheath from the electrical cable to expose a portion of the individual conductor insulation covering the at least one electric conductor by
        placing at least a portion of the electrical cable having the first sheath dimension longitudinally between the first pair of cutting members,
        with the electrical cable having the first sheath dimension longitudinally between the first pair of cutting members, cutting at least partially through a portion of the outer sheath by moving the electrical cable stripping and cutting tool toward the closed position, motion of the electrical cable stripping and cutting tool toward the closed position causing the cutting surfaces of the first pair of cutting members to move together over the electrical cable to cut at least partially through a portion of the outer sheath of the electrical cable, and
        removing the cut portion of the outer sheath; and
    when it is determined that the electrical cable has the second sheath dimension, removing a cut portion of the outer sheath from the electrical cable to expose a portion of the individual conductor insulation covering the at least one electric conductor by
        placing at least a portion of the electrical cable having the second sheath dimension longitudinally between the second pair of cutting members,
        with the electrical cable having the first sheath dimension longitudinally between the second pair of cutting members, cutting at least partially through a portion of the outer sheath by moving the electrical cable stripping and cutting tool toward the closed position, motion of the electrical cable stripping and cutting tool toward the closed position causing the cutting surfaces of the second pair of cutting members to move together over the electrical cable to cut at least partially through a portion of the outer sheath of the electrical cable, and removing the cut portion of the outer sheath.

17. The method of claim 16, wherein the electrical cable stripping and cutting tool further includes
a fourth pair of cutting members formed on the first and second elongated members, one of the fourth pair of cutting members being formed on one of the first and second elongated members, the other of the fourth pair of cutting members being formed on the other of the first and second elongated members, each of the fourth pair of cutting members having a cutting surface oriented along the length of the first elongated member and the length of the second elongated member, each cutting surface of the fourth pair of cutting members being presented toward the other cutting surface of the fourth pair of cutting members, the cutting surfaces of the fourth pair of cutting members being shaped and dimensioned to cut through the individual conductor insulation covering one electrical conductor without cutting the one electrical conductor when at least a portion of the one electrical conductor covered by the individual conductor insulation extends laterally between the fourth pair of cutting members, and
a fifth pair of cutting members formed on the first and second elongated members, one of the fifth pair of cutting members being formed on one of the first and second elongated members, the other of the fifth pair of cutting members being formed on the other of the first and second elongated members, each of the fifth pair of cutting members having a cutting surface oriented along the length of the first elongated member and the length of the second elongated member, each cutting surface of the fifth pair of cutting members being presented toward the other cutting surface of the fifth pair of cutting members, the cutting surfaces of the fifth pair of cutting members being shaped and dimensioned to cut through the individual conductor insulation covering one electrical conductor without cutting the one electrical conductor when at least a portion of the one electrical conductor covered by the individual conductor insulation extends laterally between the fifth pair of cutting members,
the cutting surfaces of the fourth pair of cutting members being shaped and dimensioned to cut through an individual conductor insulation having a first insulation dimension and the cutting surfaces of the fifth pair of cutting members being shaped and dimensioned to cut through an individual conductor insulation having a second insulation dimension, the first insulation dimension being larger than the second insulation dimension, the method further including:
determining whether the exposed individual conductor insulation has the first insulation dimension or the second insulation dimension;
when it is determined that the electrical cable has the first insulation dimension, removing a cut portion of the individual conductor insulation from the electrical cable to expose the at least one conductor by
placing at least a portion of the exposed individual conductor insulation having the first insulation dimension between the fourth pair of cutting members,
with the exposed individual conductor insulation having the first insulation dimension between the fourth pair of cutting members, cutting at least partially through a portion of the individual conductor insulation by moving the electrical cable stripping and cutting tool toward the closed position, motion of the electrical cable stripping and cutting tool toward the closed position causing the cutting surfaces of the fourth pair of cutting members to move together over the exposed individual conductor insulation portion of the electrical cable to cut at least partially through a portion of the individual conductor insulation covering the at least one electrical conductor, and
removing the cut portion of the outer sheath;
when it is determined that the electrical cable has the second insulation dimension, removing a cut portion of the individual conductor insulation from the electrical cable to expose the at least one conductor by
placing at least a portion of the exposed individual conductor insulation having the second insulation dimension between the fifth pair of cutting members,
with the exposed individual conductor insulation having the second insulation dimension between the fifth pair of cutting members, cutting at least partially through a portion of the individual conductor insulation by moving the electrical cable stripping and cutting tool toward the closed position, motion of the electrical cable stripping and cutting tool toward the closed position causing the cutting surfaces of the fifth pair of cutting members to move together over the exposed individual conductor insulation portion of the electrical cable to cut at least partially through a portion of the individual conductor insulation covering the at least one electrical conductor, and
removing the cut portion of the outer sheath.

18. The method of claim 17, including:
with at least a portion of the electrical cable between at least one of the first and second pairs of cutting members and the electrical cable stripping and cutting tool in the closed position, holding the electrical cable stationary and longitudinally moving the electrical cable stripping and cutting tool with respect to the electrical cable to at least partially urge the cut portion of the outer sheath longitudinally with respect to the electrical cable; and
with the exposed individual conductor insulation between at least one of the fourth and fifth pairs of cutting members and the electrical cable stripping and cutting tool in the closed position, holding the electrical cable stationary and laterally moving the electrical cable stripping and cutting tool with respect to the electrical cable to at least partially urge the cut portion of the individual conductor insulation laterally with respect to the electrical cable.

19. The method of claim 16, including spreading handle portions of the first and second elongated members apart under the bias of a biasing member to move the electrical cable stripping and cutting tool into the open position.

20. The method of claim 19, including applying a force to the first and second handles to move the electrical cable stripping and cutting tool into the closed position, the force applied to the first and second handles causing the handles to move together, the first and second elongated members to pivot about the pivot axis, and the first and second face plates to move together.

* * * * *